US011751290B2

(12) United States Patent
Adler et al.

(10) Patent No.: US 11,751,290 B2
(45) Date of Patent: Sep. 5, 2023

(54) AUTONOMOUS WINTER SOLAR PANEL

(76) Inventors: Jeffrey Scott Adler, Beaconsfield (CA); Harold Russell Baird, Marietta, GA (US)

(*) Notice: Subject to any disclaimer, the term of this patent is extended or adjusted under 35 U.S.C. 154(b) by 0 days.

(21) Appl. No.: 13/507,958

(22) Filed: Aug. 9, 2012

(65) Prior Publication Data

US 2014/0041713 A1 Feb. 13, 2014

(51) Int. Cl.
*H05B 3/26* (2006.01)
*H02S 40/12* (2014.01)

(52) U.S. Cl.
CPC ............... *H05B 3/26* (2013.01); *H02S 40/12* (2014.12); *H05B 2203/003* (2013.01); *H05B 2203/014* (2013.01); *Y02B 10/20* (2013.01); *Y02B 10/70* (2013.01)

(58) Field of Classification Search
CPC ....... Y02E 60/721; Y02E 10/52; Y02E 10/47; Y02E 10/40; Y02E 10/50; Y02E 10/563; Y02E 10/544; H01L 31/0547; H01L 31/048; H01L 31/0543; H01L 31/05; H01L 31/052; H01L 31/04; H01L 31/0725; H01L 31/02021; H01L 27/142; H02J 5/005; H02J 7/35; H02J 3/383; Y02T 90/122; Y02T 10/7005; H02S 40/12
USPC .................................................. 136/243–265
See application file for complete search history.

(56) References Cited

U.S. PATENT DOCUMENTS

| | | | | |
|---|---|---|---|---|
| 4,015,585 A | * | 4/1977 | Fattor | 126/578 |
| 5,867,858 A | * | 2/1999 | Kelly | 15/250.19 |
| 7,718,943 B2 | * | 5/2010 | Johnson | B60S 1/0822 |
| | | | | 250/208.1 |
| 2004/0246596 A1 | * | 12/2004 | Dyson et al. | 359/742 |
| 2010/0275968 A1 | * | 11/2010 | Kaiser et al. | 136/244 |
| 2011/0005563 A1 | * | 1/2011 | Bisges | F24D 11/003 |
| | | | | 136/206 |
| 2011/0056924 A1 | * | 3/2011 | Townsend | 219/213 |
| 2011/0308574 A1 | * | 12/2011 | Vaidyanathan | 136/246 |
| 2013/0141902 A1 | * | 6/2013 | Akdag | 362/191 |
| 2014/0166044 A1 | * | 6/2014 | Klier et al. | 134/1 |

FOREIGN PATENT DOCUMENTS

DE 102006039034 A1 * 2/2008 ............ B60S 1/0822
WO WO 2011141892 A2 * 11/2011

OTHER PUBLICATIONS

Machine translation of DE 102006039034 A1, Dietrich.*

* cited by examiner

*Primary Examiner* — Mayla Gonzalez Ramos

(57) ABSTRACT

Disclosed herein is an autonomous solar panel for use in winter conditions. The panel includes at least one energy transfer member associated with the solar panel. A sensor is in communication with the energy transfer member. A power supply is connected to the energy transfer member. A network interconnects the energy transfer member, the sensor, and the power supply, and is configured so that when the sensor senses an accumulation of winter precipitation on the solar panel, a portion of stored power in the power supply activates the energy transfer member and the winter precipitation is removed from the solar panel.

41 Claims, 25 Drawing Sheets

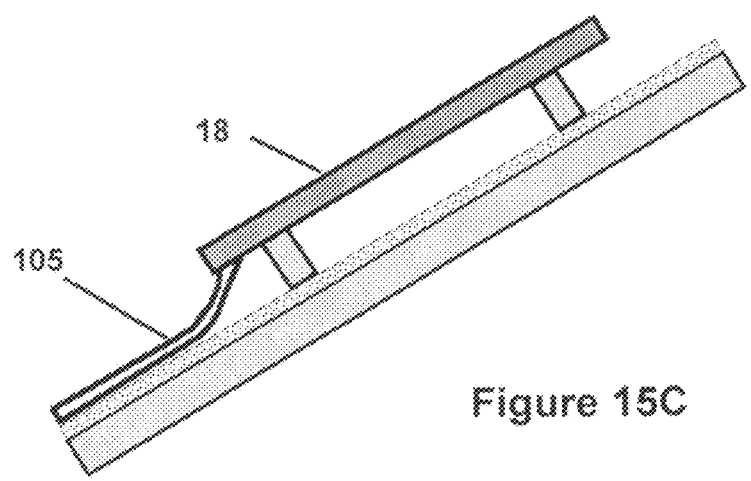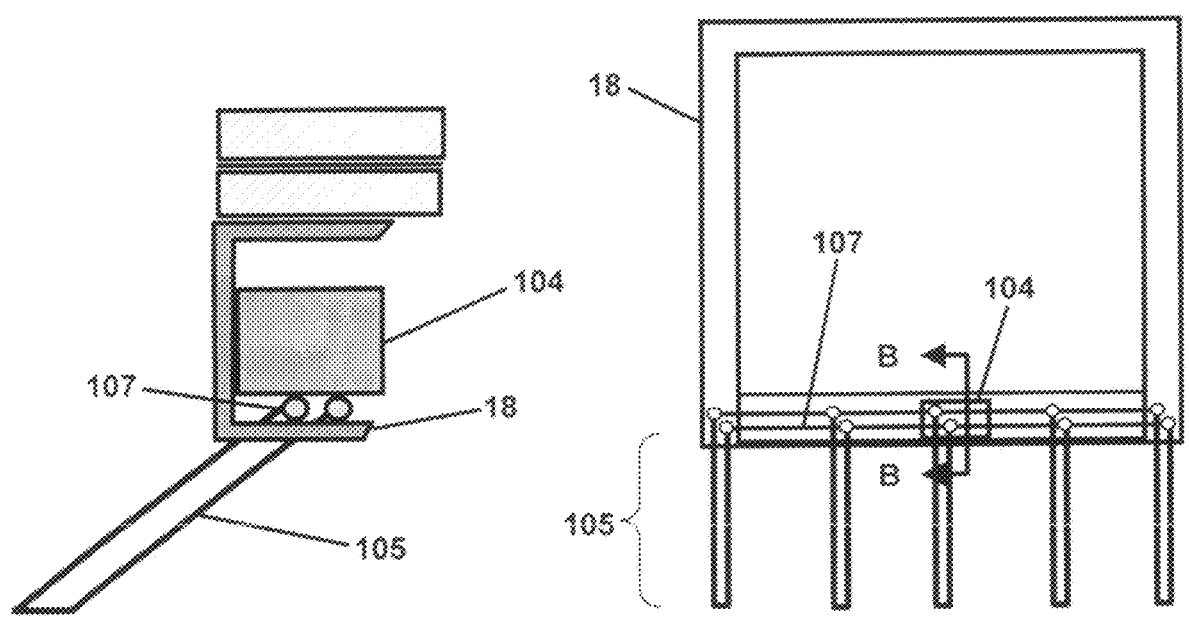

Top View

Side View

AUTONOMOUS WINTER SOLAR PANEL

TECHNICAL FIELD

The present relates to solar panels, and more particularly to autonomous solar panels for use in winter conditions.

BACKGROUND

The development of photovoltaic technology has evolved over the last thirty years and is now one of the most promising sources of alternative energy in areas conducive with high levels of uninterrupted solar capacity. Concurrently, as a result of natural resources being limited and unable to last forever, it is the implementation of sustainable so-called "green" energy that has the capacity to fulfill our energy needs now and in the future.

Solar photovoltaic panels have been made and marketed to accommodate weather in states and countries that have an abundance of sunshine and limited winter weather conditions given that the panels must remain clear and clean at all times to maximize the solar energy output. Locations with winter weather precipitation (snow, frost, sleet, ice, hail) including higher latitude areas have had many challenges given the reduced energy produced and cost effectiveness of this green technology. Contrary to common knowledge, photovoltaic energy is enhanced under cold winter temperatures.

A number of designs have been used to address at least some of the aforesaid problems. One design described in PCT application PCT/US2010/000803 (WO 2010/107491) to Ball et al. for "Photovoltaic Module with Heater" is a roof mounted solar panel with a heater in which heating filaments embedded in, or located on, a transparent panel are connected to an external power source operable using a switch to selectively heat and melt snow that has collected on the solar panel. Another design described in PCT application PCT/US2010/032832 (WO 2010/127037) to Kaiser et al for "Solar Power Systems Optimized for use in Cold Weather Conditions" is a system in which electrical energy is supplied to a load based on solar energy. The system includes a mode select switch which permits switching between one mode, where a solar cell supplies electrical energy to a load, and a second mode, where a power supply supplies energy to the solar cell so that it generates heat.

Thus, there is a need for an improved solar panel cleaning device which provides reliable solar energy power in areas that may have winter conditions, which would reduce or negate the effective energy output.

Features of the discovery will be apparent from a review of the disclosure, drawings and description below.

BRIEF SUMMARY

The present relates generally to framed and frameless autonomous winterized solar photovoltaic panels that can effectively produce year round energy on a reliable and consistent basis thereby reducing our carbon footprint. This can be achieved by diverting a small portion of stored photovoltaic panel power to at least one heat and/or mechanical energy generator to effectively remove winter precipitation in an autonomous manner.

Accordingly, there is provided an autonomous solar panel for use in winter conditions, the panel comprising:
at least one energy transfer member associated with the solar panel;
at least one sensor in communication with the energy transfer member;
a power supply connected to the energy transfer member; and
a network interconnecting the energy transfer member, the sensor, and the power supply, the network being configured such that in response to the sensor sensing an accumulation of winter precipitation on the solar panel, a portion of stored power in the power supply activates the energy transfer member so as to remove the winter precipitation from the solar panel.

In one example, the solar panel includes a solar panel cover, the energy transfer member is a heater which is embedded within the solar panel cover. The heater is a serpentine heating wire which is disposed substantially across the entire solar panel cover.

In one example, the network includes a heater switch connecting the power supply to the sensor. The network includes a controller connecting the sensor to the heater switch. The power supply is a battery. The network includes a charger connecting the solar panel to the battery. A load switch connects to the charger. A user load connects to the load switch.

In one example, the solar panel includes a winter precipitation sensor and a temperature sensor. The solar panel includes a solar panel cover and a solar panel voltaic array, and the temperature sensor sandwiched therebetween, the controller connects to the temperature sensor. The network includes a user heater voltage supply connected to the load switch.

In another example, the network includes a user load connecting a controller to a solar panel voltaic array of the solar panel. The network includes a supplemental heater switch connecting the controller to a heater supplement supply. The network includes a remote display connected to the controller.

In yet another example, the energy transfer member includes at least one vibration assembly. The solar panel includes a solar panel cover and a solar panel voltaic array, and the vibration assembly being sandwiched therebetween. The vibration assembly is located at the periphery of the solar panel. The solar panel includes four vibration assemblies, two of which are spaced apart and located at a top edge of the solar panel, the other two being spaced apart and located at a bottom edge of the solar panel.

In one example, the network is configured such that in response to the sensor sensing the accumulation of winter precipitation on the solar panel, the portion of stored power in the power supply activates the vibration assembly to vibrate the solar panel so as to remove the winter precipitation therefrom. The vibration assembly is a vertical vibration assembly and includes a vertical vibration actuator, a vertical vibration plunger, and a resilient vibrator lever connected to the solar panel cover. The network includes a vibrator switch connecting a controller to a voltage supply to activate the vibration actuator.

In an alternative example, the vibration assembly is a horizontal vibration assembly and includes a vibration actuator, a vibration plunger, a cam lever, and a resilient vibrator lever connected to the solar panel cover. The network includes a vibrator switch connecting a controller to a voltage supply to activate the vibration actuator.

In one example, a frame holds together the solar panel cover and the solar panel voltaic array. The solar panel further includes a solar panel frame heater. The frame heater includes a plurality of heater elements connected to a frame heater switch, the heater elements extending substantially along the bottom of the frame.

In one example, the power supply includes a plurality of batteries located between the underside of the solar panel and a panel tilt mount on which the solar panel and batteries are mounted.

In another example, the power supply includes a plurality of batteries located in or on the side of a vertical post connected to a panel tilt mount on which the solar panel is mounted.

In another example, the power supply includes a plurality of batteries located between the underside of the solar panel and a frame mount on which the solar panel is mounted.

In another example, the power supply includes a plurality of batteries located separately from the solar panel.

In one example, the power supply includes a plurality of batteries located between the underside of the solar panel and a roof mount on which the solar panel is mounted.

In one example, the sensor includes one or more light emitting devices which illuminate the solar panel upper outer surface and a light sensing device which senses the reflection caused by winter precipitation.

In one example, a temperature sensor is located on the inner surface of the solar panel cover to determine when winter precipitation is possible and to determine when the panel cover has been sufficiently heated.

In another aspect, there is provided an autonomous solar panel for use in winter conditions, the panel comprising:
  a heater element associated with the solar panel
  at least one sensor in communication with the heater element;
  a power supply connected to the heater element; and
  a network interconnecting the heater element, the sensor, and the power supply, the network being configured such that in response to the sensor sensing an accumulation of winter precipitation on the solar panel, a portion of stored power in the power supply activates the heater element so as to heat the solar panel to remove the winter precipitation therefrom.

In another aspect, there is provided an autonomous solar panel for use in winter conditions, the panel comprising:
  a vibration assembly associated with the solar panel;
  at least one sensor in communication with vibration assembly;
  a power supply connected to the vibration assembly; and
  a network interconnecting the vibration assembly, the sensor, and the power supply, the network being configured such that in response to the sensor sensing an accumulation of winter precipitation on the solar panel, a portion of stored power in the power supply activates the vibration assembly so as to vibrate the solar panel to remove the winter precipitation therefrom.

In another aspect, there is provided an autonomous solar panel for use in winter conditions, the panel comprising:
  a combination of a heater element and a vibration assembly associated together with the solar panel;
  at least one sensor in communication with the heater element and vibration assembly;
  a power supply connected to the heater element and vibration assembly; and
  a network interconnecting the heater element, the vibration assembly, the sensor, and the power supply, the network being configured such that in response to the sensor sensing an accumulation of winter precipitation on the solar panel, a portion of stored power in the power supply activates the heater element and vibrations assembly so as to heat and vibrate the solar panel to remove the winter precipitation therefrom.

In yet another aspect, there is provided an autonomous solar panel cleaning system for use in winter conditions, the panel comprising:
  a controller;
  at least one energy transfer member associated with the solar panel;
  at least one sensor in communication with the energy transfer member;
  a power supply connected to the energy transfer member; and
  a network interconnecting the controller, the energy transfer member, the sensor, the power supply, the network being configured such that in response to the sensor sensing an accumulation of winter precipitation on the solar panel, a portion of stored power in the power supply activates the energy transfer member so as to remove the winter precipitation from the solar panel.

In another aspect, there is provided an autonomous solar panel system for use in winter conditions, the system comprising:
  a master solar panel having an master energy transfer member associated therewith;
  a plurality of slave solar panels, each panel having a slave energy transfer member associated therewith;
  at least one sensor in communication with the master solar panel;
  a master controller connected to the master solar panel;
  a plurality of slave controllers, each slave controller being connected to the respective slave solar panels;
  a power supply connected to each of the master and the slave energy transfer members; and
  a network interconnecting the energy transfer members, the sensor, the power supply, the network being configured such that in response to the sensor sensing an accumulation of winter precipitation on the master solar panel, a portion of stored power in the power supply activates the master and the slave energy transfer members so as to remove the winter precipitation from the master and the slave solar panels.

In another aspect, there is provide a circuit comprising:
  a solar panel;
  at least one energy transfer member associated with the solar panel;
  at least one sensor in communication the energy transfer member;
  a power supply connected to the energy transfer member; and
  a network interconnecting the energy transfer member, the sensor, and the power supply, the network being configured such that in response to the sensor sensing an accumulation of winter precipitation on the solar panel, a portion of stored power in the power supply activates the energy transfer member so as to remove winter precipitation from the solar panel.

BRIEF DESCRIPTION OF THE DRAWINGS

In order that the discovery may be readily understood, embodiments of the discovery are illustrated by way of example in the accompanying drawings.

FIG. 15A is a plan view of a panel frame heater extension option;

FIG. 15B is a cross-sectional view taken along lines B-B showing a framed panel frame heater extension option;

FIG. 15C is a side view of the panel of FIG. 15A;

Further details of the AWSP and its advantages will be apparent from the detailed description included below.

DETAILED DESCRIPTION

We have designed an autonomous system for photovoltaic solar panels to operate efficiently in all winter weather conditions. The system is equipped with components to sense and remove winter precipitation such as snow, frost, ice and sleet, to maximize and restore panel performance to peak solar energy output levels. The system provides at least one type of energy transfer in the form of heat and/or panel cover shaking to remove the winter precipitation from the panel surface. The panels can independently remove the winter precipitation through solar powered energy that is stored in a self-contained solar powered battery compartment. This may be supplemented by AC/DC power supply. The system maximizes solar energy output of the solar panels and effectively provides a higher level of efficiency throughout the entire daylight hours in a cost effective manner. Under extreme winter conditions, the system may simultaneously or sequentially employ both the solar panel surface heating and the solar panel surface shaking to remove the winter precipitation during a cleaning cycle.

Figure 1:
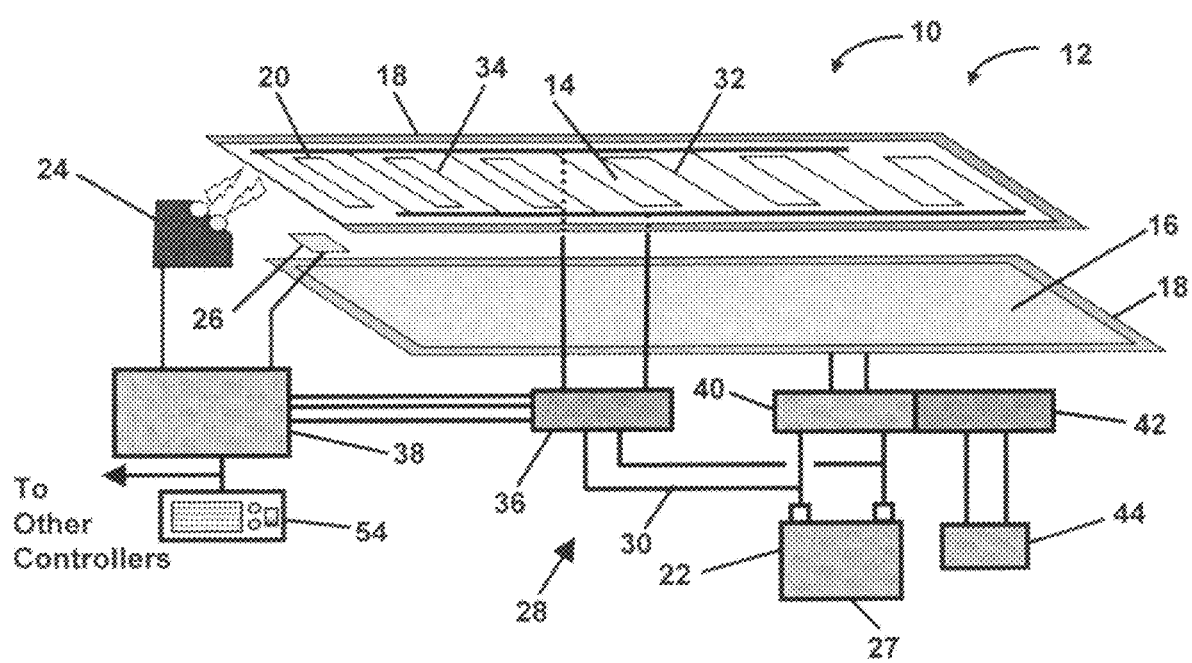
FIG. 1 is a diagrammatic representation of a framed, autonomous winter solar panel showing a self-sufficiency option.
Figure 2:
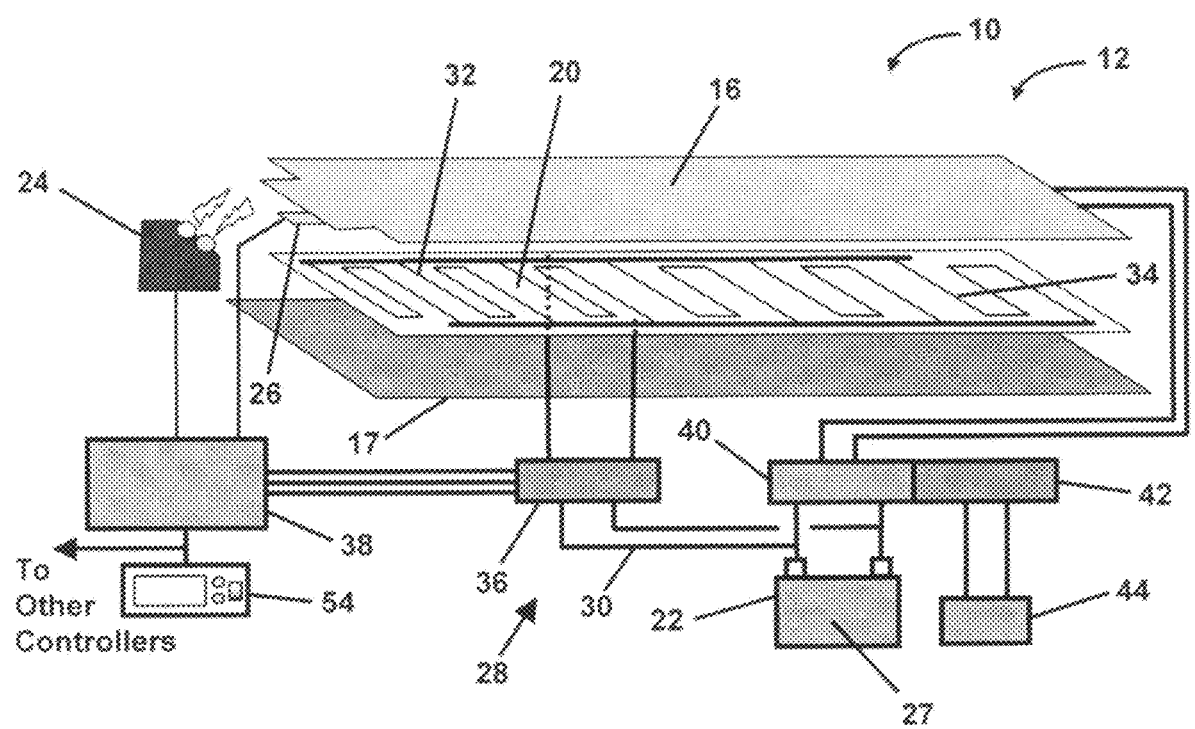
FIG. 2, is a diagrammatic representation of a frameless (sandwich), autonomous winter solar panel showing resistive array self-sufficiency option.

Referring now to FIGS. 1 and 2, there is illustrated generally at 10 an autonomous winter solar panel (AWSP) and system for use in winter conditions to provide power to a utility grid (e.g., solar parks), commercial property or buildings as well as various residential formats in areas with significant winter weather. The AWSP 10 senses and removes accumulated snow and ice in order to restore solar panel performance. The AWSP 10 includes one or more photovoltaic solar panels 12, each having a translucent cover 14 located over a photovoltaic array (cells) 16. As best illustrated in FIG. 1, the cover 14 and the array 16 are held together by a frame 18 and are mounted on a pedestal or on an inclined frame, as will be described below. The panels 12 are generally rectangular in shape, although other shapes may be used. The cover 14, typically glass, is located over the photovoltaic cells 16 and protects them from rain, hail, snow, ice, flying debris, and the like. The photovoltaic cells 16 are arranged in a flat array to produce direct current and voltage to an energy transfer member 18. Other configurations such as an integrated cover/photovoltaic assembly are also provided. The AWSP 10 includes an energy transfer member 18, a power supply 22 and two sensors, namely an ice, sleet, snow (winter precipitation) sensor 24 and a temperature sensor 26. Although two sensors are illustrated throughout, it is to be understood that the system can operate almost as effectively with only the winter precipitation sensor. In one example, the power supply 22 is one or more batteries 27. A network (or circuit) 28 electrically interconnects the energy transfer member 18, the sensors 24, 26, and the power supply 22. The network 28 uses a plurality of wires 30 to interconnect the energy transfer member 18, the sensors 24, 26, the power supply 22, and other components which are described below. The temperature sensor 26 is sandwiched between the cover 14 and the photovoltaic cells 16. The temperature sensor 26 is a standard negative or positive temperature coefficient resister mounted to the underside of the cover glass and connected via two wires to the controller. Other temperature sensors can be used such as integrated circuits, thermocouples and sensors embedded in the controller. Other sensor locations and combinations of sensors can be used.

Referring specifically to FIGS. 1 and 2, framed or sandwich panels may be installed on rooftops, solar parks and ground installations, depending on the cost vs. benefit choice made by the owner. For home owners desirous of winter precipitation removal from solar panels, rooftop location of the framed version of the solar panels is more advantageous because of their higher efficiency and limited available rooftop space. For solar parks where available space is large, the frameless (sandwich version), as illustrated in FIG. 2, is advantageous. However, if the solar park is located near an urban area where available space might be limited, the framed version might be used.

I. Panel Heating

Figure 3:
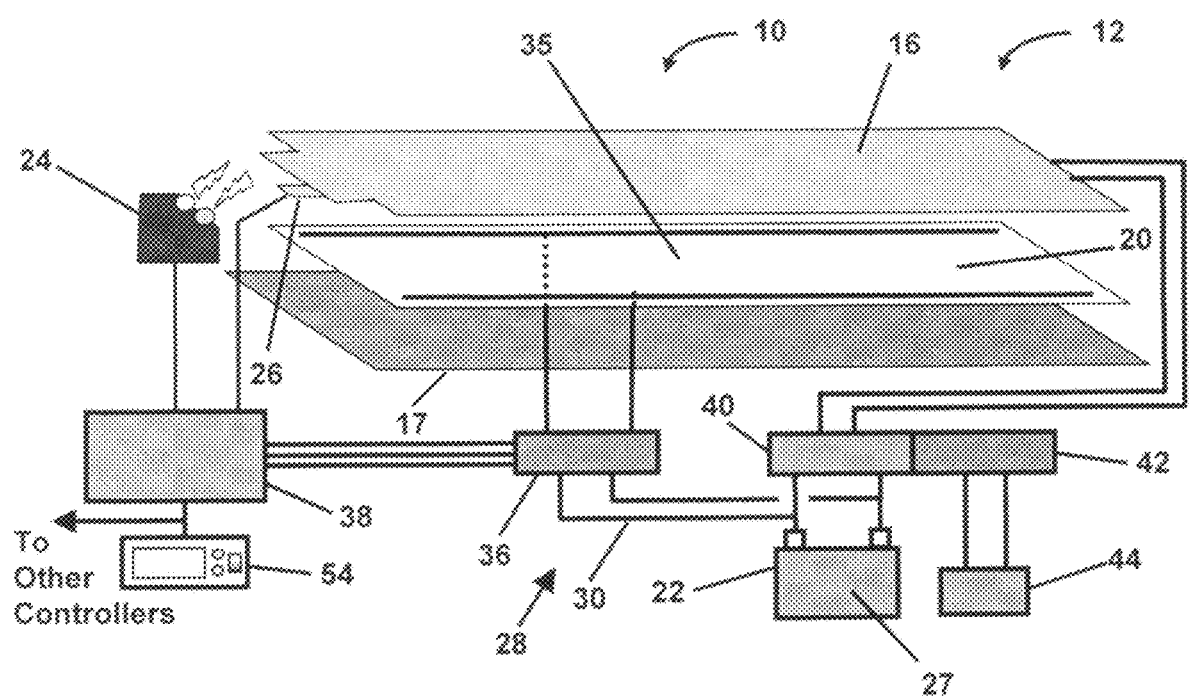
FIG. 3, is a diagrammatic representation of a frameless (sandwich), autonomous winter solar panel showing a self-sufficiency option and a resistive film heater.
Figure 4:
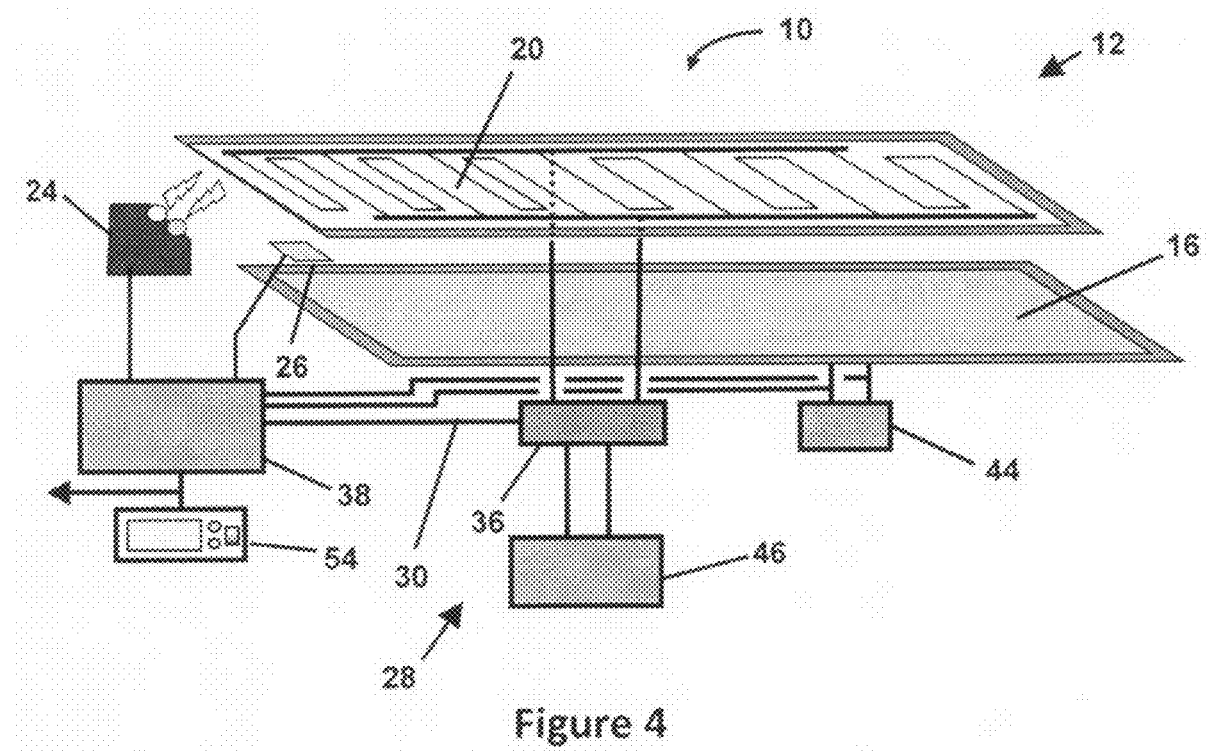
FIG. 4 is a diagrammatic representation of an autonomous winter framed solar panel showing a user heater supply option.
Figure 5:
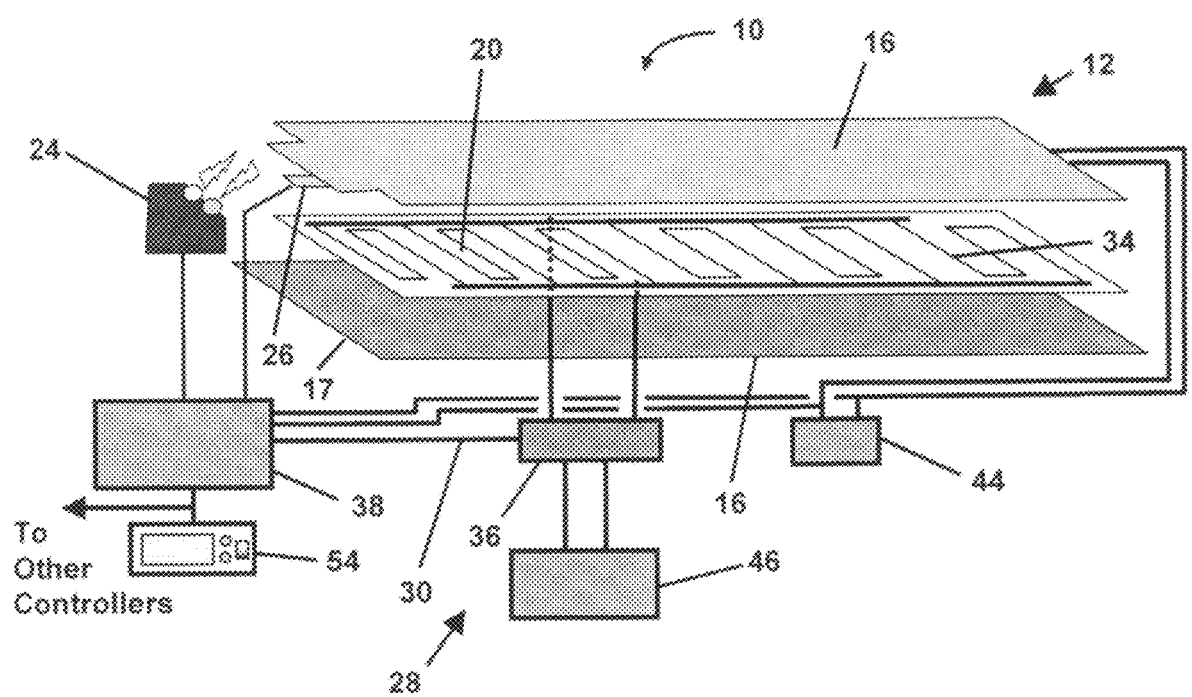
FIG. 5 is a diagrammatic representation of an autonomous winter frameless solar panel with a resistive array user supply option.

As best illustrated in FIGS. 1 and 4, for framed panels, the energy transfer member 18 is a heater 32 which is embedded within the solar panel cover 14. The heater 32 is a plurality of heating elements 34 which are disposed substantially across the entire solar panel cover 14. As best illustrated in FIGS. 2 and 5, for frameless panels the energy transfer member 18 is a heater 32 which is sandwiched between photovoltaic cells 16 and a backing 17. The heater 32 may also be a resistive film heater 35, as best illustrated in FIG. 3 for a frameless panel, which is sandwiched between the backing 17 and the photovoltaic cells 16. A person skilled in the art will also recognize that the resistive film heater 35 may also be applied to the solar panel cover 14 in lieu of heating elements 34. A heater switch 36 connects the power supply to the sensor. The AWSP 10 can be operated self-sufficiently. This self-sufficient option advantageously permits use of the AWSP 10 in remote areas and/or for "green" power applications where the solar panel provides power to a user isolated from normal utility services. Moreover, this option is useful to reduce safety issues associated with cleaning crews, who may be prone to falling off ladders or may suffer back injuries during operations to remove winter precipitation from the panels. Power can also be provided to a utility grid. When operating self-sufficiently, a portion of the solar panel 12 output is used to charge one or more of the batteries 27, which are then used to provide electricity to heat the applicable framed cover 14 or frameless photovoltaic array 16. The solar panel mounting assembly, which is described in more detail below, orients the solar panel to face the sun. The network 28 is configured so that when the sensors 24, 26 sense an accumulation of winter precipitation on the solar panel 12, a portion of stored power in the power supply 22 activates the energy transfer member 20 so as to begin removing the winter precipitation from the solar panel 12.

Still referring to FIGS. 1, 2, 3, 4, 5, 6, and 7, the network 28 includes a controller 38 connecting the sensors to the heater switch 36. The controller 38 is one or more printed circuit boards with a programmable microprocessor and interface circuitry to the sensors, switches, electrical power and a remote display. The controller 38 is powered by the battery 27. A number of microprocessors, integrated circuits, discrete components and programmable logic are well known to one skilled in the art and can be used with the controller function in a winter environment if properly selected and integrated. A battery charger 40 connects the solar panel 12 to the batteries 27. A load switch 42 is connected to the battery charger 40, which in turn is connected to a user load 44. The battery charger 40 is connected directly to the photovoltaic array 16, whereas the heater switch 36 is connected to the heating wire 34.

Referring now to FIG. 4, which illustrates the framed panel option, and FIG. 5, which illustrates the frameless panel option, a user heater supply option is illustrated in which the network 28 includes a user heater voltage supply 46 which is connected to the heater switch 36. The user load 44 is connected to the photovoltaic array 16 with the controller 38 being connected to the heater switch 36. The controller 38 is connected to the sensors 24, 26. In this case, the user heater voltage supply 46 is acting as the power supply 22. The user heater supply option is typically used where the solar panel provides power to an electricity grid that can provide power back, avoiding the necessity to use a battery and charger. In this mode, all of the panel output is supplied to the user load, and some is "bought back" when needed to heat the cover and remove ice and snow. In this case, the load switch is absent. The battery charger 40 and the battery 27 are smaller capacity devices included in the controller 38, and use a small portion of the solar panel output to store and provide power to the controller 38. The user load 44 is connected directly to the photovoltaic panel output. A user heater voltage supply 46 is connected to the heater switch 36 and is fed to panel heater and optional frame heater, described below, when required by controller 38.

Figure 6:
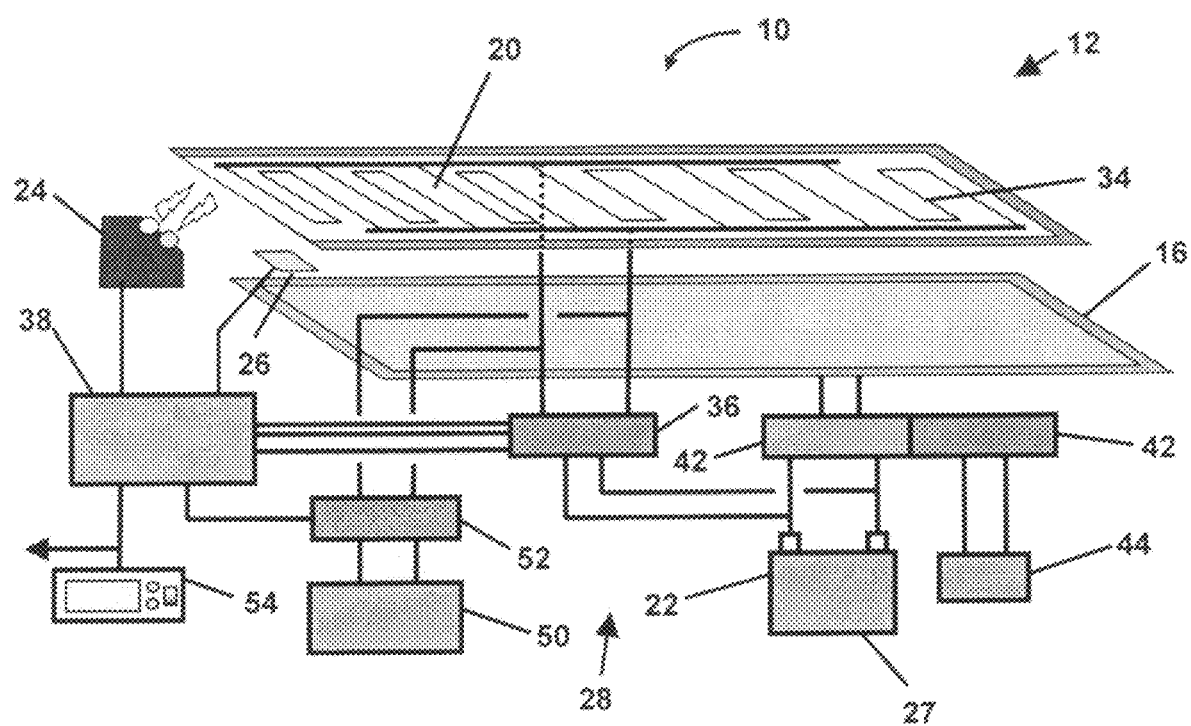
FIG. 6 is a diagrammatic representation of an autonomous framed solar panel with heater supplement option.
Figure 7:
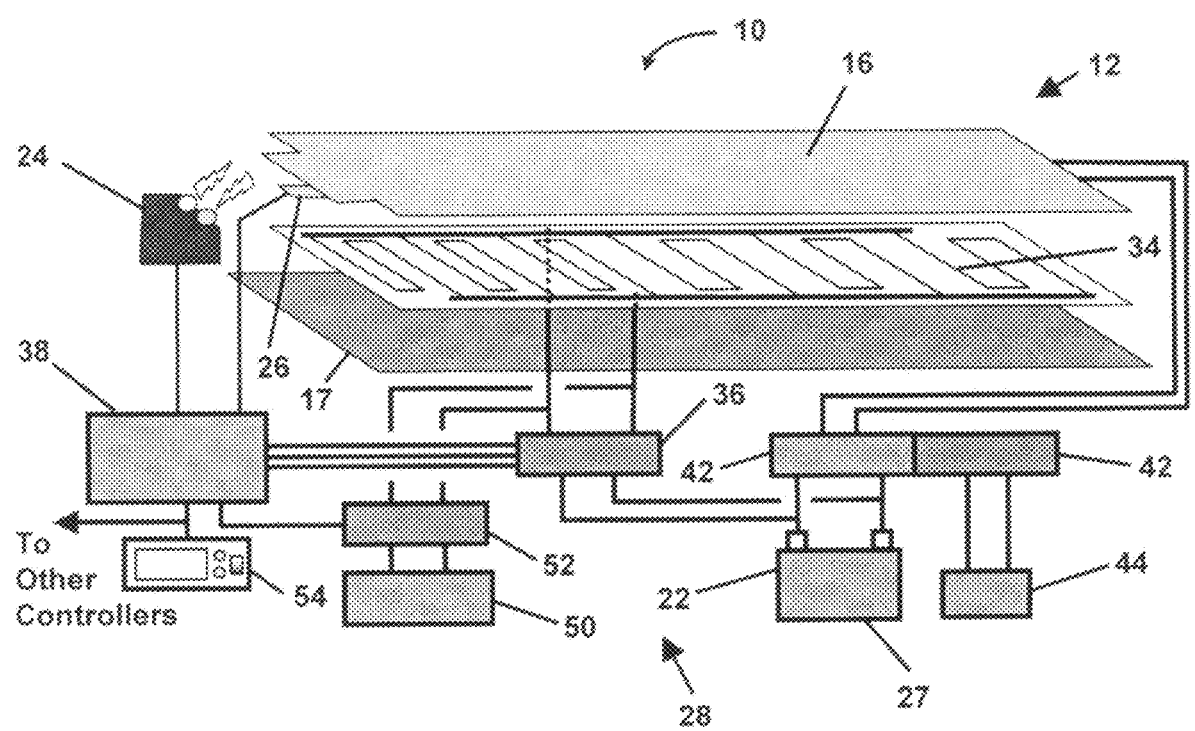
FIG. 7 is a diagrammatic representation of an autonomous frameless solar panel with a resistive array heater supplement option.

Referring now to FIG. 6, which illustrates the framed panel option, and FIG. 7, which illustrates the frameless panel option, the network 28 includes a supplemental heater supply option 50, which is connected to a supplemental heater switch 52. The supplemental heater switch 52 is connected to the controller 38 and also to the wires 30 connecting the heater switch 52 to the heating elements 34. The supplemental heater supply 50 is for specific cases where it is necessary to supply extra power if, for example, the temperature is well below −20° C. for a prolonged period of time. The user is tied into the power grid and only implements this additional grid power when the self-contained panel battery supply is exhausted. The use of the supplemental heater supply 50 combines self-sufficiency with the user heater supply. The batteries power the panel heater, an optional frame heater, and optional frame heater optional extensions as described below, and the controller 38. The user heater supply 50 is fed by the supplement heater switch 52 when commanded to do so by the controller 38. The user heater supply 50 would be used when the batteries 27 have insufficient power for a snow, sleet and ice removal cycle.

Referring again to FIGS. 1 through 7, a remote display 54 is connected to the controller by a bus and provides power, ground and data. The bus also provides for multiple controllers and displays, but typically one display would be connected either to one controller, or a group of controllers in a multiple panel installation. A RS-485 bus is used, but the bus could be USB, Ethernet, CAN, SPI, I2C etc., and still meet the requirements. Also suitable for a one controller, one remote display is a connection using RS-232, parallel port, USB, custom cable, and the like. If power is available separately for the remote display 54, wireless and optical links are also suitable.

Figure 8B:
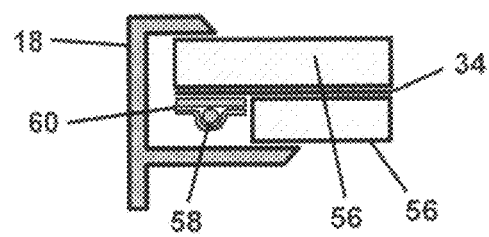
FIG. 8B is a cross sectional view taken along line A-A showing a resistive array framed panel heater.
Figure 8C:
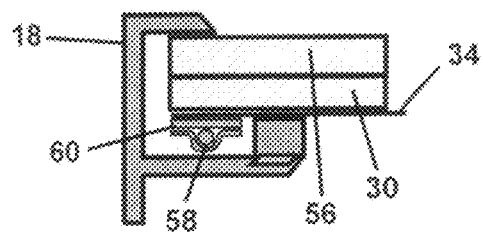
FIG. 8C is an alternative cross sectional view taken along line A-A showing a frameless option of the resistive array.
Figure 8A:
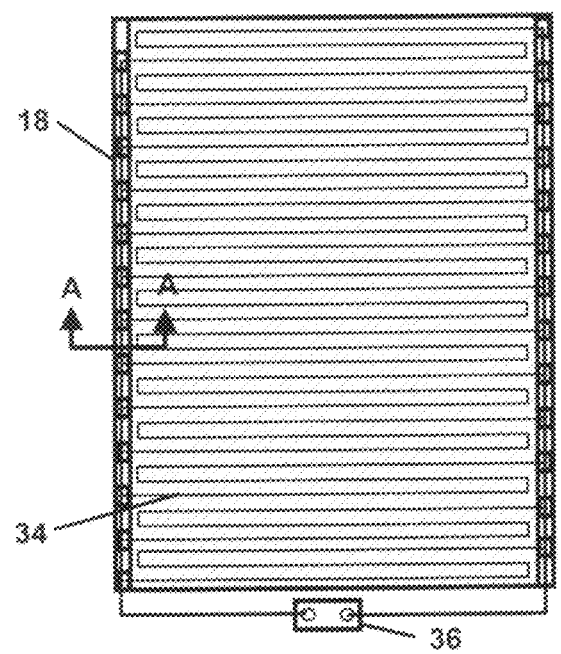
FIG. 8A is a plan view of a framed solar panel showing heating elements.

Referring now to FIGS. 8A, 8B and 8C, the heater elements 34 are shown as evenly spaced. However, the heating elements 34 can be more closely spaced at the bottom edge of the panel cover 14 to even out convection heat transfer underneath the top cover glass to its top edge, and to enhance removal of ice buildup at the bottom of the panel. Other heater element geometries are also permissible, for example, vertical orientation, wavy line or zig zag patterns, and the like. Thirteen heating elements 34 are illustrated with one loop back in each element; however, each panel size will have a different number of elements and arrangements to match the heat required with the panel geometry and the heating element material used. Each heating element 34 includes a positive voltage applied to one end and a ground or negative voltage applied at the other end so as to generate heat. Alternating or direct current may be used. The heating element should be thin so as to not affect the solar panel performance. Nickel chromium (NiCr) heater wire is commonly used. 26 gauge wire with a resistance of 8.43 ohms/meter is a typical wire size. Other materials such as thin strips of copper or copper/iron alloys may also be used. The heating elements can be likened to an electrically resistive array similar to a typical vehicle rear window defogger.

Still referring to FIGS. 8A, 8B and 8C, the solar panel cover frame 18 includes a laminated cover glass 56 with heater element 34. Current from a supply or ground wire 58 passes through a conductive adhesive foil 60 to heater element 34. Locating the heater element 34 between the glass laminates keeps the heater elements 34 in contact with the glass for good heat transfer and minimizes heat radiation loss to the panel interior. Placing the heater element 34 on the glass outer surfaces is feasible and efficient, but there is substantial risk of damage. Also, locating the heater elements 34 on the bottom layer of a single layer cover glass is also feasible if the adhesive technique used is suitably translucent. The heater element 34 may also use a translucent resistive film such as tin oxide. A laminate would not be required, since the film can be placed on the inside layer of the panel.

Figure 9B:
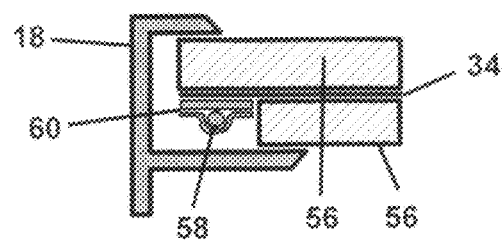
FIG. 9B is a cross sectional view taken along line A-A showing a resistive array framed film panel heater.
Figure 9C:
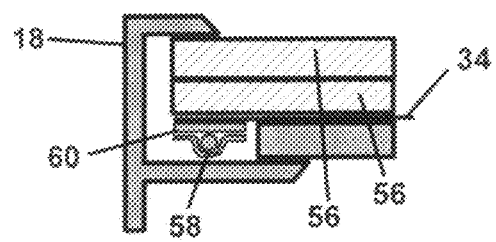
FIG. 9C is an alternative cross sectional view taken along line A-A showing a frameless option of the resistive array film panel heater.
Figure 9A:
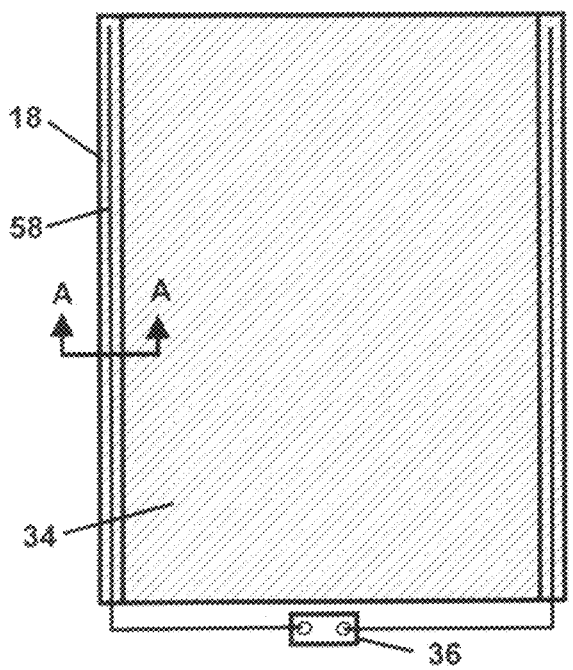
FIG. 9A is a plan view of a framed solar panel showing a film heater.

Referring now to FIGS. 9A, 9B and 9C, there is illustrated a panel heater of the resistive film type. The design is essentially identical to that described above in FIGS. 8A, 8B and 8C, except that instead of discrete heating elements 34, the heater is a resistive film located between the laminated panels 56 or beneath the laminated panels 56.

Other heater elements 34 that can be used to transfer heat may include the following non-limiting examples:

1. Infrared heater elements with focusing reflectors below or above the cover glass;
2. Microwave energy focused on the glass (requires a special glass able to absorb microwave energy at low temperatures);
3. Hot air passing under or in the panel cover by pressurized force or convection;
4. Snow and ice melt solvent such as glycol applied to the panel glass; and
5. Heating coil heater utilizing resistive element/wire, hot air or hot liquid.

II. Batteries

The photovoltaic panel output is fed to the battery charger. The battery charger is designed for photovoltaic applications and is commercially available. The battery charger tailors the charge rate for the battery 27 for optimal charging. When the photovoltaic panel output is greater than the battery charging requirement, the charger transfers the excess photovoltaic output via its load switch to user load, which can be an electric utility grid and/or a local load for the user. The integrated charger/load switch is typically used, but alternate methods whereby controller 38 monitors the state of the battery charge and activates a separate load switch, or a smart load switch monitors the battery charge, can also be used. Typical batteries used include a sealed type such as an absorbed glass mat (AGM) or gel battery which can be charged at low temperatures and have a long life. More compact high energy types, for example, nickel metal hydride (NiMH), lithium hydride (LiH), and the like, may become suitable. When the controller 38 determines that snow, sleet or ice removal is required, it activates the switch to feed battery power to the panel heater and optional frame heater.

It should be noted that the system may be powered using any type of electrochemical device that can be used to store energy. One example of an alternative energy store is an electrochemical battery that is fueled by electrolytes rather than lithium ions.

III: Component Location

Figure 10:
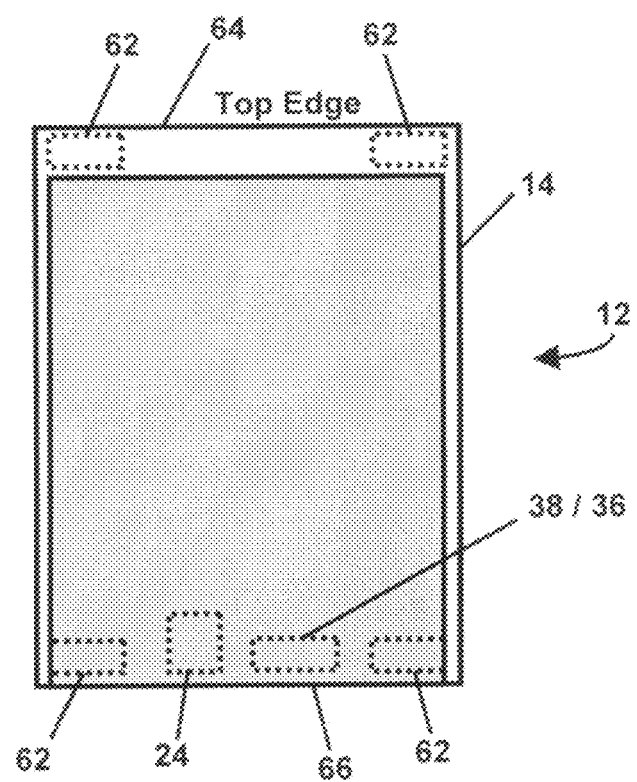
FIG. 10 is a plan view of a solar panel showing the location of the vibration assemblies, sensors and system components.

Referring now to FIG. 10, typical locations for components located in the panel assembly 12 are shown for a conventional 1.5 meter tall by 1 meter wide panel where the heater elements 34 are positioned from side to side rather than bottom to top. All components required for user heater supply option are located in the panel 12, allowing for compact packing, shipping and storage. The snow and ice sensor and the temperature sensor are typically located at the panel bottom edge where precipitation is likely to accumulate on the panel cover.

IV. Panel Vibration

Figure 11:
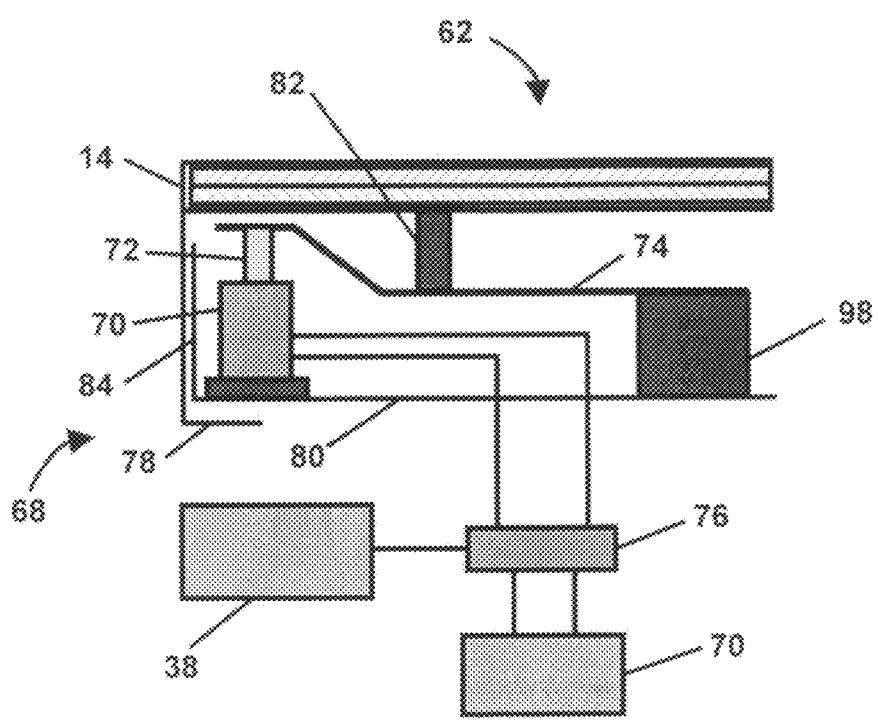
FIG. 11 is a diagrammatic representation of a vertical vibration assembly for a framed panel.
Figure 12:
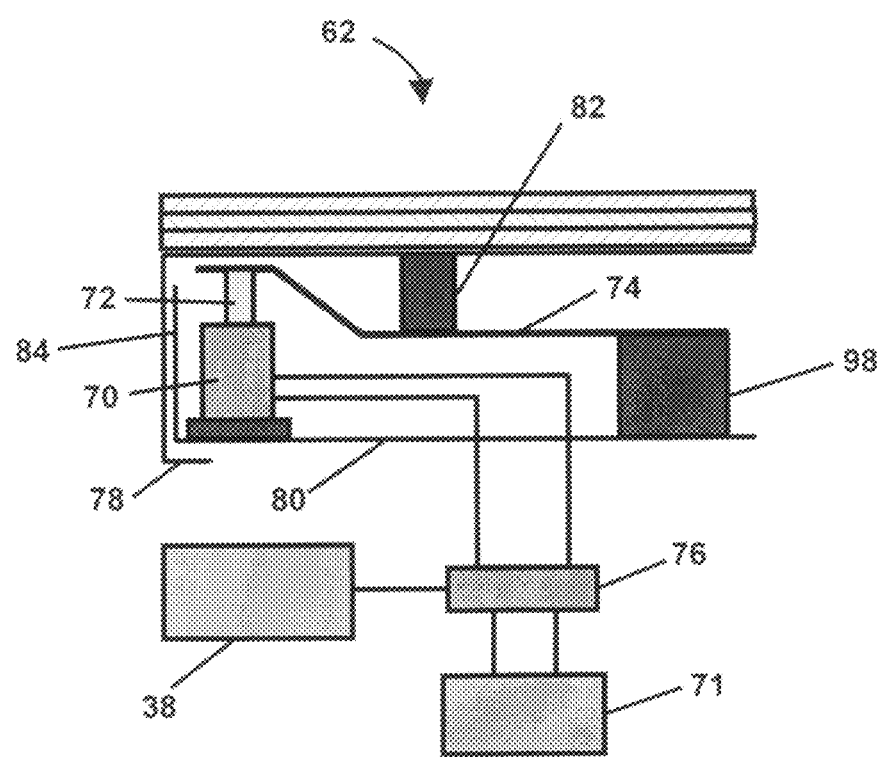
FIG. 12 is a diagrammatic representation of a vertical vibration assembly for a frameless panel.
Figure 13:
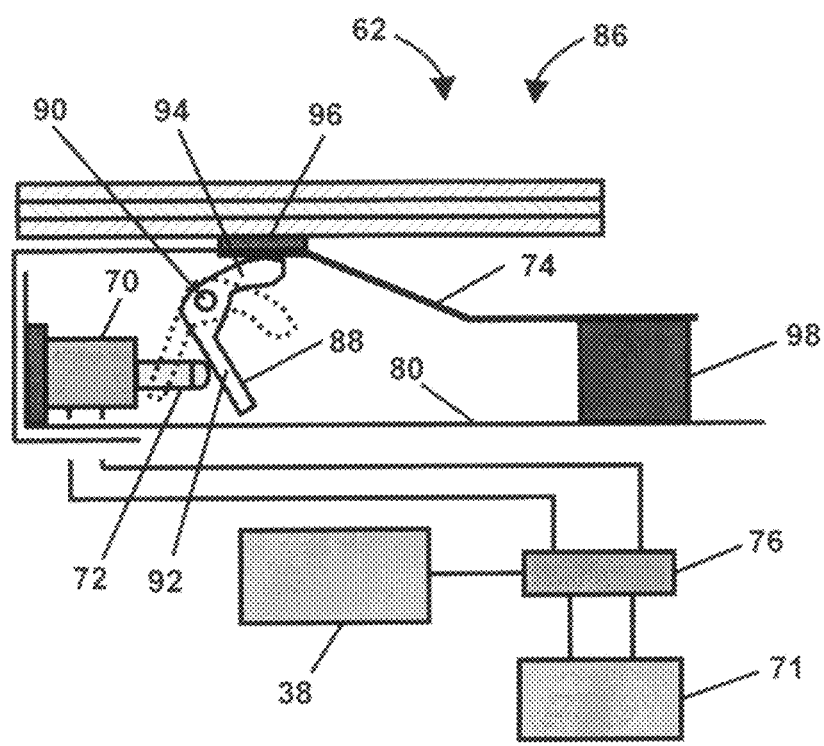
FIG. 13 is a diagrammatic representation of a horizontal vibration assembly for a frameless panel.

Referring now to FIGS. 11, 12, and 13, in addition to heating, the AWSP 10 can use vibrational energy to remove accumulated winter precipitation. In this case, the energy transfer member includes at least one vibration assembly 62.

As best illustrated in FIGS. 10 and 11, the vibration assembly 62 is located at the periphery of the solar panel 12. Four vibration assemblies 62 are shown, two of which are spaced apart and located at a top edge 64 of the solar panel 12, while the other vibration assemblies 62 are spaced apart and located at a bottom edge 66 of the solar panel 12. In the vibration mode, the network 28 is configured such that in response to the sensors sensing the accumulation of winter precipitation on the solar panel 12, the portion of stored power in the batteries activates the vibration assembly 62 to vibrate the surface of the solar panel 12 at a frequency that is sufficiently high to cause vibration of the accumulated winter precipitation causing destabilization thereof and, because the solar panels 12 are angled, cause sliding of the destabilized accumulation and removal thereof from the solar panel.

Referring now to FIG. 11, which illustrates the framed panel option, and FIG. 12, which illustrates the frameless panel option, the vibration assembly 62 is a vertical vibration assembly 68 and includes a vertical vibration actuator 70, a vertical vibration plunger 72, and a resilient vibrator lever 74 connected to the solar panel cover. The vertical vibration assembly 68 is activated by a vibrator switch 76 which is connected to the controller 38 as part of the network 28 described above. A vibration switch 76 connects either a battery or a user DC voltage supply to the vibration actuator 70. The vertical vibration assembly 68 is sandwiched between a solar panel cover frame 78 and a solar photovoltaic array frame 80 which is located around the periphery of the solar panel. The vibrator actuator 70 is mounted on the solar photovoltaic array frame and is disposed generally orthogonal to the frame. The vibrator plunger 72 is mounted on the vibrator actuator 70 for movement into and out of the vibrator actuator 70. The resilient vibrator spring lever 74 is mounted on the plunger 72 and a support 98 and extends therebetween. A vibrator pin 82 is connected to the solar panel cover frame 78 and the resilient spring lever 74 so as to transfer vibrational energy from the vibrator plunger 72 to the frame. The vertically mounted vibration actuator 70 is attached to the resilient spring lever 74 such that there is a lever style mechanical advantage to moving the panel cover frame. Other attachment positions can be suitable depending on the force and displacement capability of the actuator.

When the vertical vibration is required, the controller 38 switches the vibrator switch 76 on to feed the battery or user the heater voltage supply to the vibrator actuator 70. This causes the vibrator actuator plunger 72 to move in, which moves the solar panel cover down, thereby bending the vibrator spring lever 74. The controller 38 then switches the vibrator switch 76 off. The vibrator plunger 72 relaxes, allowing the vibrator spring lever 74 to move solar panel cover back to its rest position. Little motion damping is provided, so the cover motion will oscillate about its rest position. The controller 38 continues to switch the vibrator switch 76 on and off for the programmed vibration time at the natural oscillation frequency of the vibrator spring lever 74 and the solar panel cover combination to maximize the motion amplitude. The vibration actuator plunger 72 which moves out instead of in when power is applied is also a suitable approach.

Although an electromechanical vibrator is shown, other vibrators can be used if they have suitable motion and force characteristics, and include, for example, piezoelectric vibrators and an electric motor with an unbalanced flywheel. The electric motor would require being switched on and off only at the start and end of the programmed vibration time.

Still referring to FIGS. 11 and 12, the vertical vibration assembly includes a motion interlock 84 between solar panel cover frame and solar panel photovoltaic array frame. At rest, the vibrator spring lever 74 supports the panel weight, including snow, sleet or ice. If the panels are stacked for storage, or lifted by the solar panel cover frame, the interlock prevents damage to the components inside, including protecting the vibrator spring lever 74 from being extended or compressed beyond its spring limit.

Another option is to coat the upper frame and cover glass with a non-stick translucent material such as a silicone based film. This is a facilitator for the vibrators, allowing the snow, sleet or ice to slide off with a shorter vibration cycle, or under some circumstances, with no vibration cycle.

Alternatively, the winter precipitation may be mechanically removed using a selection from the following:

1. A motorized scraper system such as a windshield wiper style (articulated or not articulated), or a blade moving vertically or horizontally across the panel cover on tracks located on the panel edge;
2. Blowing high pressure air at the panel cover glass;
3. Rotating the panel to an upside down position briefly; and
4. Covering the panel when snowing or icing starts, flipping the cover back to the retracted position when the sun is available.

Referring now to FIG. 13, an alternative vibration assembly 62 is illustrated. The vibration assembly 62 is a horizontal vibration assembly 86 and includes the vibration actuator 70, the vibration plunger 72, a cam lever 88, and the resilient vibrator lever 74 connected to the solar panel cover. This vibration assembly is illustrated with the frameless panel option. The vibrator actuator 70 is mounted on an upstanding portion of the solar panel photovoltaic array frame and is disposed substantially parallel to the plane of the frame. The vibration plunger 72 is mounted in the vibrator actuator 70 for movement into and out of the vibrator actuator 70. The cam lever 88 is mounted on a mounting pin 90 for rotational movement thereabout. One arm 92 of the cam lever 88 contacts the vibration plunger 72 whereas another arm 94 of the cam lever 88 contacts a vibrator body 96 that is fixed to the underside of the solar panel cover frame. The resilient vibrator lever 74 is mounted on the support 98 and extends between the vibrator body 96 and the support 98. When activated, the plunger 72 moves into and out of the actuator 70 and pushes the arm 92 of the cam 88, which in turn rotates about the pin 90 and transfers vibrational energy to the vibrator body 96.

The upper part of the cam lever 88 has a cam profile to achieve the desired panel cover frame vertical motion and mechanical advantage. Removing power to the actuator 70 causes the panel cover frame weight and the vibrator spring lever force to move the cam lever 88 and the actuator plunger 72 back towards their rest position. For a pull type actuator, the actuator plunger 72 is attached to the cam lever 88, and the cam lever 88 is mounted in mirror image position such that the panel cover is moved up when the actuator plunger pulls on the cam lever.

Other variations which achieve vertical motion from a horizontally mounted vibrator can also be used such as, for example, methods whereby the actuator plunger slides a wedge under the vibrator spring lever. The wedge's height versus distance profile is selected to achieve the desired panel cover frame 1 vertical motion and mechanical advantage.

When activated, the vibrators can cause some or all of the snow, sleet or ice to "avalanche" off the panel, substantially reducing the power required for removal.

In a typical example, four actuators, one actuator at each corner of the panel, are activated synchronously. Asynchronous activation, other locations such as vibrators as part of the panel mount that shakes the entire panel horizontally or vertically, and a different number of actuators can also be used.

V. Frame Heater

Figure 14B:
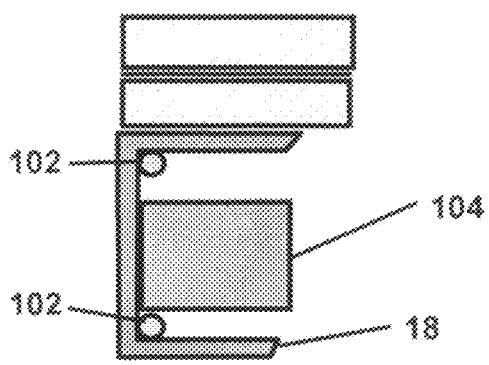
FIG. 14B is a cross-sectional view taken along lines B-B showing a frameless panel frame heater.
Figure 14A:
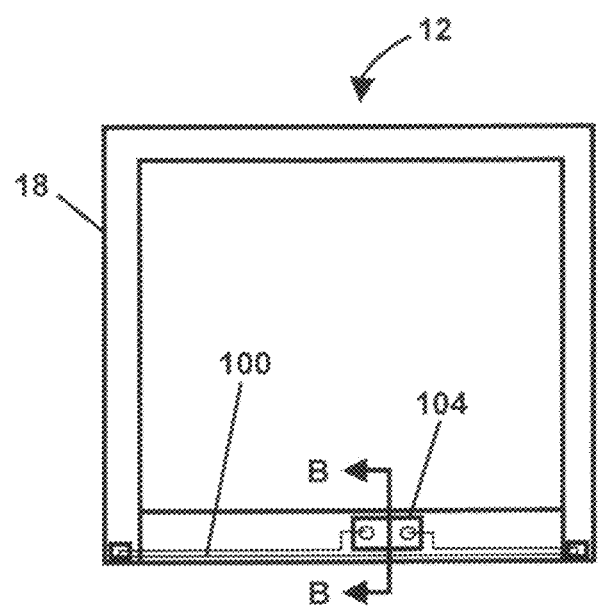
FIG. 14A is a plan view of a framed panel frame heater with the glass panel removed.

Referring now to FIGS. 14A and 14B, the solar panel 12 can further include a solar panel frame heater 100 to remove snow, sleet and ice from the frame. The frame heater 100 includes a plurality of heater elements 102 connected to a frame heater switch 104. The heater elements 102 extends substantially across the bottom perimeter of the frame. The frame heater 100 heats the solar panel cover frame bottom edge to eliminate icicles which may form from sleet or snow melt dripping down the solar panel cover frame. It is not necessary to implement the heating of the frame assembly but this may be important for outer frame precipitation removal in climates that have wide temperature fluctuations. The heater switch 36, which is used to power the panel heater, also provides power to one or a small number of panel frame heater elements 102 located in the solar panel cover frame bottom edge. The panel frame heater elements 102 would typically be enclosed in a heat conductive but electrically insulating jacket such as the type used for cook top elements, and attached to the solar panel cover frame.

Another option, which is illustrated in FIG. 15, includes one or more frame heater extensions 105. The frame heater extensions 105 are connected to the lower edge of the solar panel and to the frame heater switch 104 via junctions 107. The junctions 107 are electrically connected in series using wires 109 which run along the lower edge of the solar panel and interconnect the frame heater extensions 105. This option is particularly useful to prevent the formation of icicles or snow dams at the lower edge of the solar panel during freeze-thaw weather conditions and to combat potential ice build up.

VI. Mountings

Referring now to FIGS. 16, 17, 18, 19, 20 and 21, there is illustrated a number of mounting assemblies for the solar panels. Although not illustrated, the mounting assemblies may be used with sun tracking options to locate the solar panel surface in the direction of the sun at all times.

Figure 16:
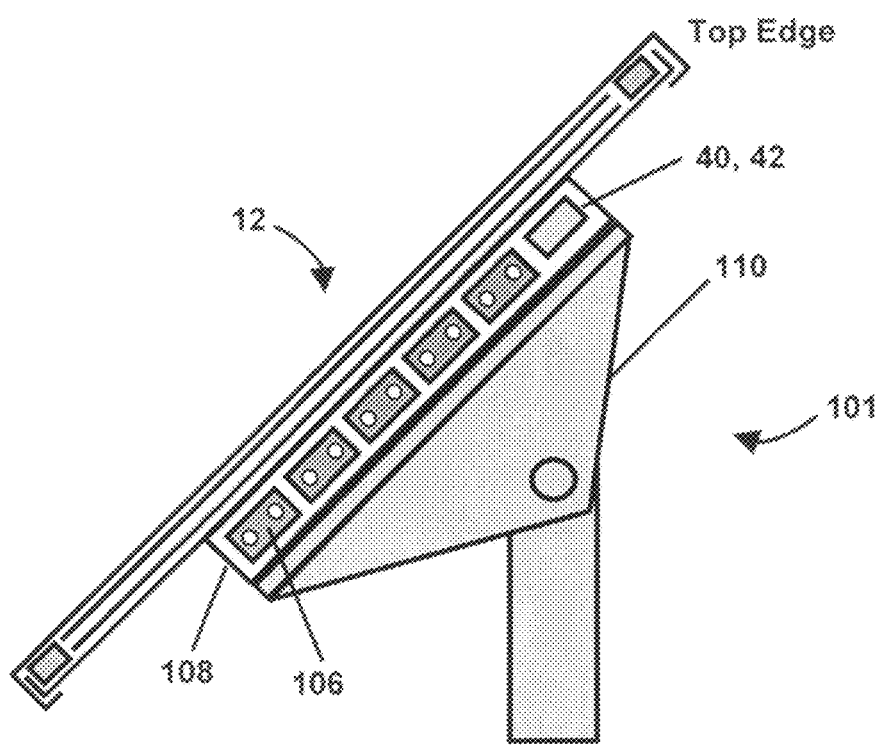
FIG. 16 is a side view of a framed panel with a flat pack battery installation located on a pedestal mount.

Referring now to FIG. 16, a solar panel mounting assembly 101 for a framed panel is illustrated in which a plurality of batteries 106 are arranged as a flat pack within a compartment 108 and located between the underside of the solar panel 12 and a panel tilt mount 110 on which the solar panel 12 is mounted. The battery charger 40 and the load switch 42 are located in compartment 108 at the top of the flat pack. The panel tilt mount 110 permits movement of the solar panel so that it faces the sun. The frameless panel option is illustrated in FIG. 17 and is identically mounted on the mounting assembly 101.

Figure 18:
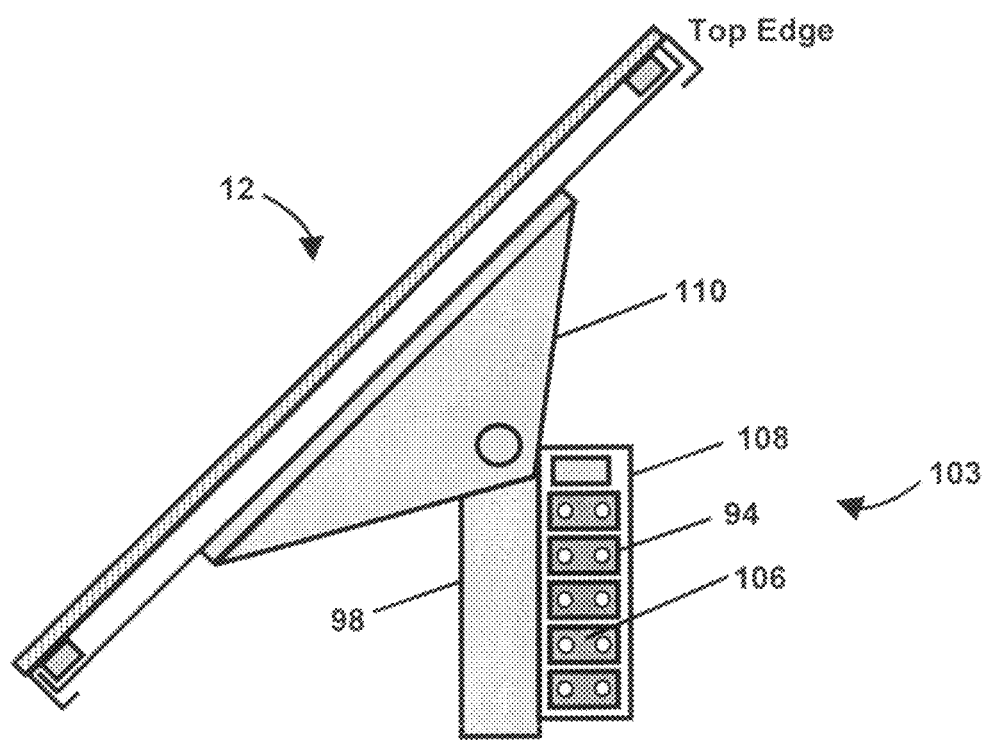
FIG. 18 is a side view of a frameless panel with an external battery compartment located on a pedestal mount.
Figure 19:
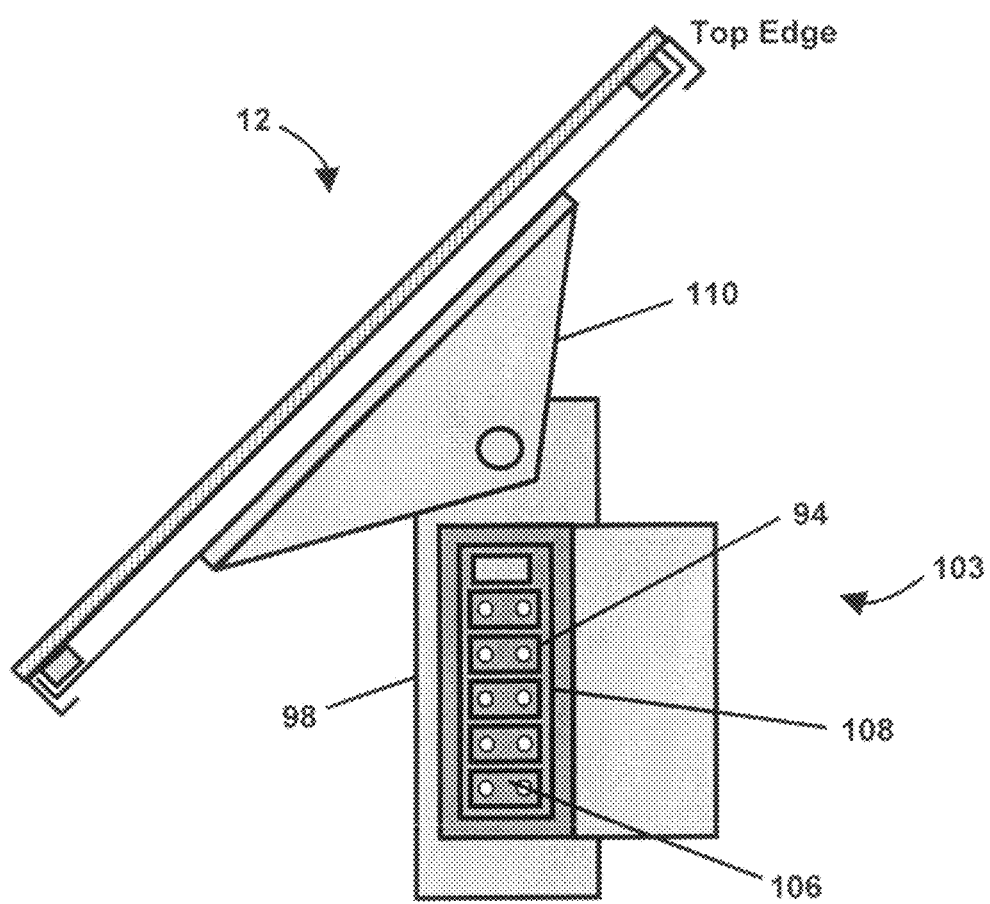
FIG. 19 is a side view of a frameless panel with an external battery compartment located inside a pedestal mount.

Referring now to FIGS. 18 and 19, an alternative solar panel mounting assembly 103 is illustrated in which the plurality of batteries 106 in the compartment 94 is selectively mounted on or in a vertical post 98 connected to the panel tilt mount 110 on which the solar panel 12 is mounted.

Figure 17:
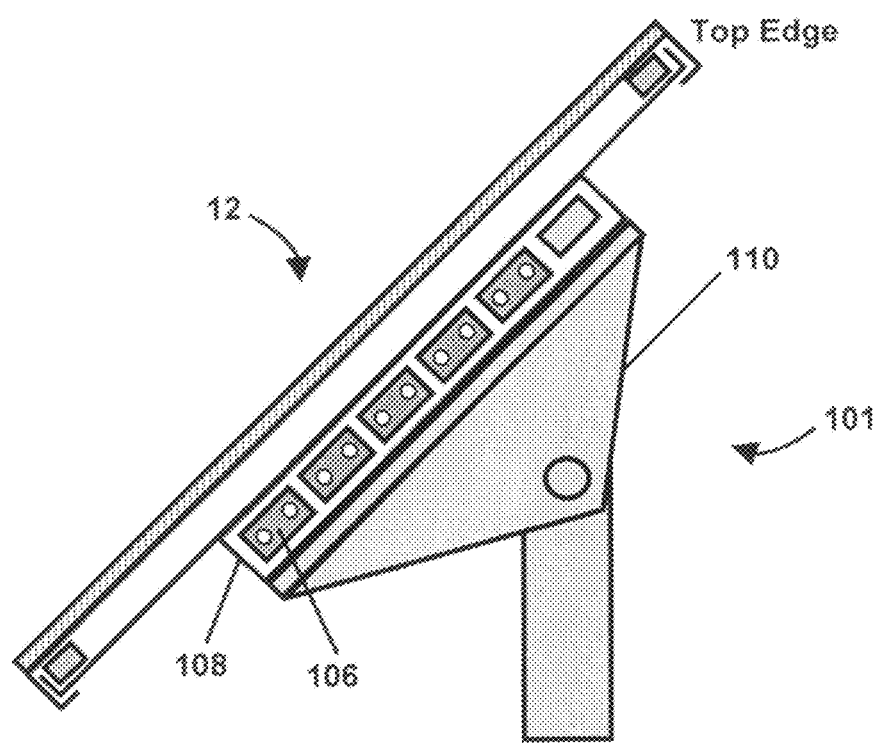
FIG. 17 is a side view of a frameless panel with a flat pack battery installation located on a pedestal mount.

Referring now to FIGS. 16 and 17, a typical battery and charger installation for the self sufficient option is located on a panel tilt mount 110. The batteries are arranged in a combination of series and parallel interconnect configuration to match the panel output voltage and the panel heater electrical current requirements. The panel tilt mount 110 attaches to the battery compartment 108 as shown. A frame mount (not shown) could also be used attached to either the solar panel photovoltaic frame like solar panels without AWSP technology, or to the battery compartment 108. The battery compartment 108 is secured with a locking mechanism that allows access by authorized personnel for service.

Figure 20:
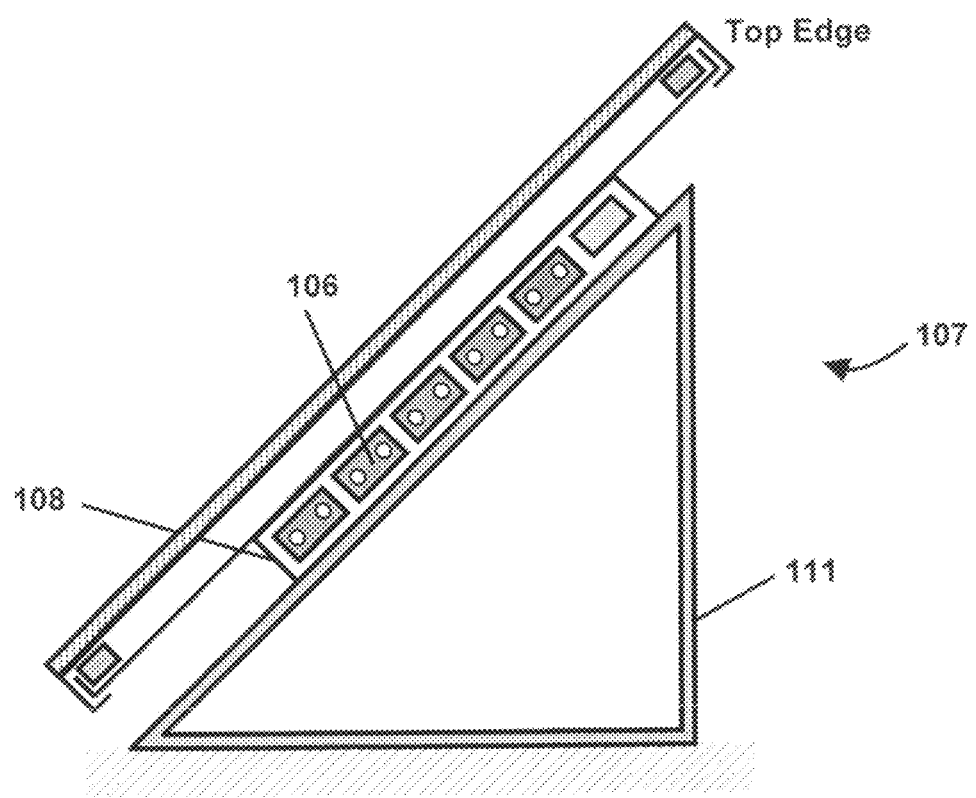
FIG. 20 is a side view of a frameless panel with a flat pack battery installation located on a frame mount.

Referring now to FIG. 20, an alternative mounting assembly 107 is illustrated for use in solar parks. Specifically, the plurality of batteries 106 are arranged as a flat pack within the compartment 108 that is mounted on a polygonal frame 111. In the example, illustrated, the polygonal frame 111 is triangular in when viewed in cross section.

Figure 21:
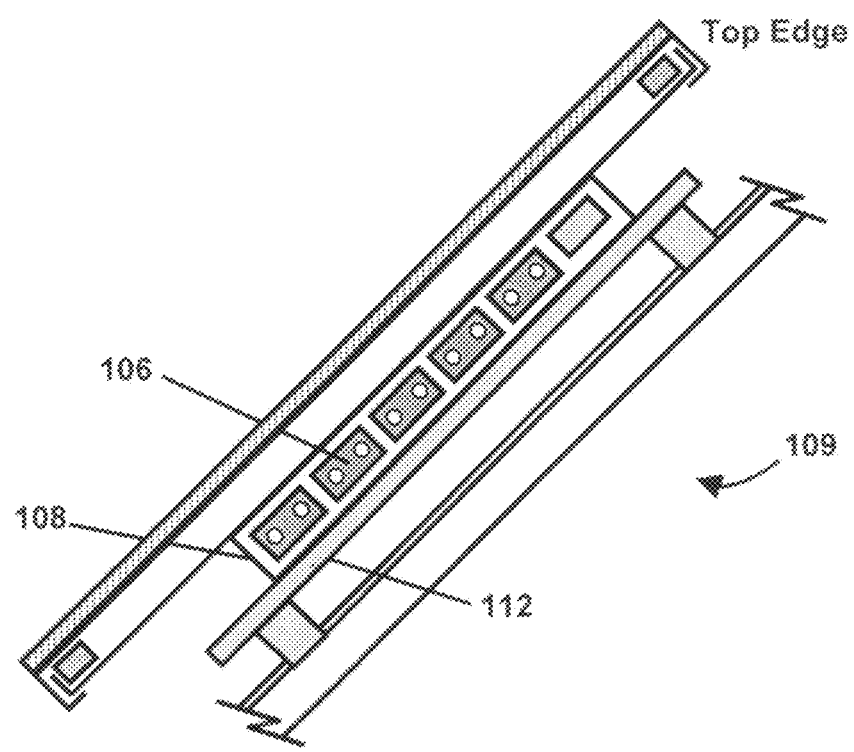
FIG. 21 is a side view of a frameless panel with a flat pack battery installation located on a roof mount.

Referring now to FIG. 21, an alternative mounting assembly 109 is illustrated for mounting the solar panels on a rooftop. A rooftop mount 112 includes a mounting face against which the plurality of batteries 106 located in the compartment 108 are located. In this assembly 109, the solar panel is the frameless panel option.

Figure 22:
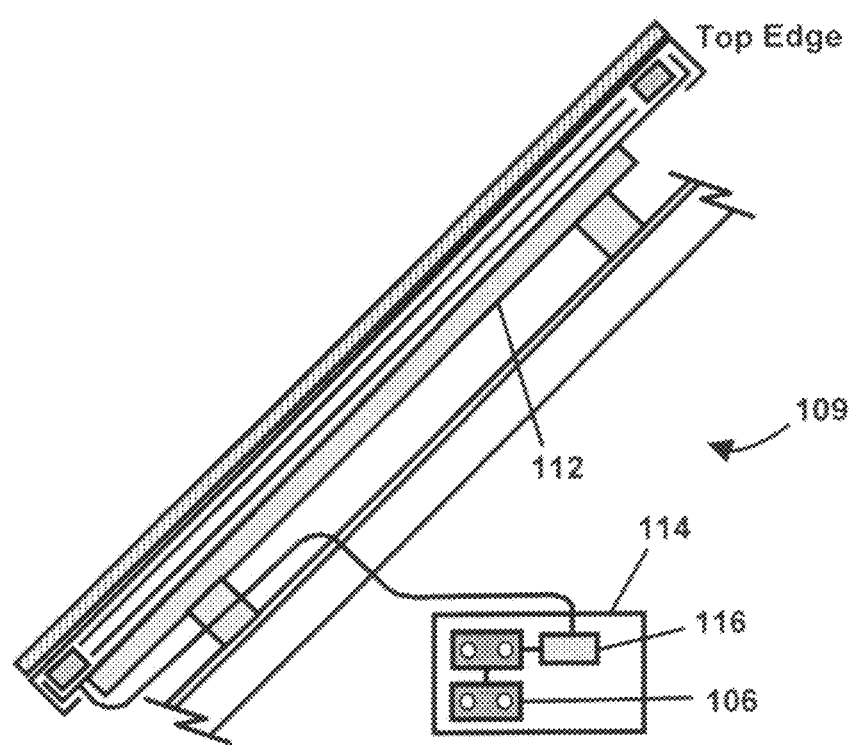
FIG. 22 is a side view of a frameless panel located on a roof mount with external batteries.

Referring now to FIG. 22, the alternative mounting assembly 109 is illustrated with an optional battery and charger installation 114 for additional capacity and/or to be utilized on its own in the self-sufficient option. Similar adaptations apparent to those skilled in the art can be made to the pedestal mount (see FIG. 18) and/or the frame mount (see FIG. 20). For a frame mount (not shown), the battery, charger and load switch compartment could be mounted on the frame. The battery, charger and load switch compartment installation could also be located in a separate enclosure (not shown) nearby, including the building that the panels may be mounted on or located close to. This could allow more efficient battery charging and therefore fewer or smaller batteries if the enclosure is heated. The separation between solar panel and battery and charger installation is determined by whatever cable cost and power loss is acceptable to the user.

A suitable option with likely lower cost is feeding the output from two or more panels into a common larger capacity battery and charger. This option could be combined with common larger capacity heater and/or vibration relays instead of individual heater and/or vibration relays in the solar panel.

It should be noted that although the solar panels are illustrated as mounted on angled mountings, the solar panels may also be mounted in horizontal orientations. It is also to be noted that the solar panels may be mounted on motor vehicles such as trucks, cars, motorcycles, recreational vehicles and the like. Furthermore, it is also to be stated that the solar panels may be integrated into the body of, or mounted on: trains, buses, subway cars, or motor vehicles such as trucks, cars, motorcycles, recreational vehicles and the like; whereby one or more of the energy transfer members in conjunction with one or more of the sensors may be implemented to facilitate winter precipitation removal.

VII. Sensors

Figure 23A:
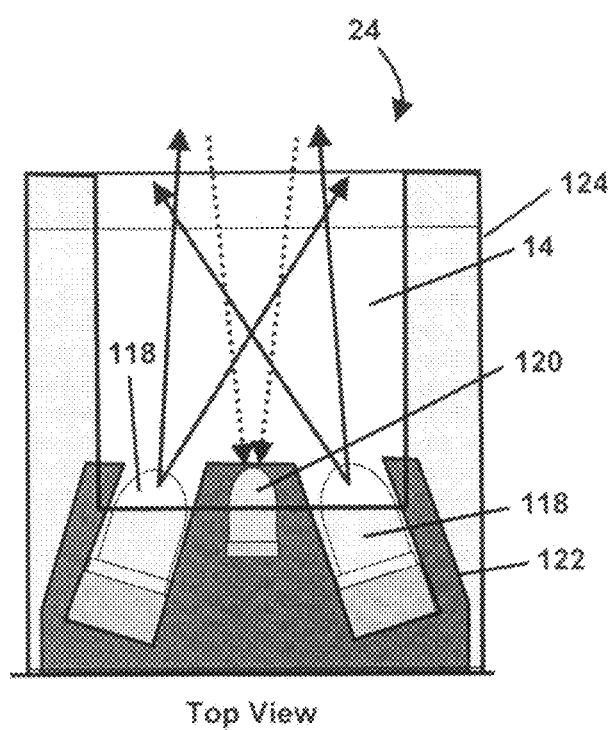
FIGS. 23A and 23B are, respectively, top and side views of a snow, sleet and ice sensor showing its location relative to a solar panel.
Figure 23B:
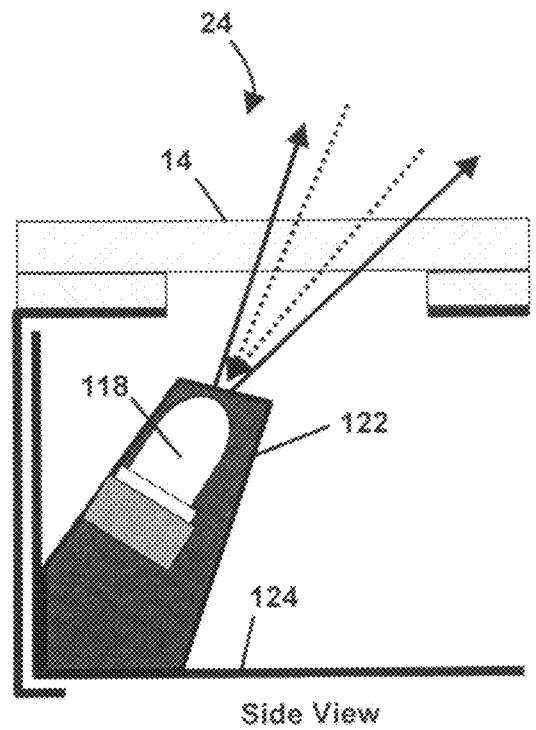

Referring now to FIGS. 1, 23A and 23B, the temperature sensor 26 is located on the inner surface of the panel cover to determine when winter precipitation is possible, thereby saving energy by avoiding unnecessary powering of the radiation emitter and radiation sensors, and to determine when the panel cover has been adequately heated. The precipitation sensor 24 includes one or more light emitting devices 118 which illuminate the solar panel upper outer surface 14 and a light sensing device 120 which senses the reflection from winter precipitation. The light emitting devices 118 and the light sensing device 120 are mounted in a sensor mount 122, which is mounted in a housing 124. The light emitting device 118 is a radiation source, which is typically one or more light emitting diodes (LEDs), while the light sensing device 120 (radiation sensor) is typically a photo diode or photo transistor. To prevent stray light from affecting the sensor, the radiation sources are narrow beams; the sensor has a narrow field of view, and the sensor mount 122 baffles the light. The radiation sources 118 and the sensor 120 are at an incidence angle to the panel cover glass so that the source light is not reflected back into the sensor by the glass, but not at a high incidence angle where the light would be totally reflected back into the interior. The radiation sources and the sensor are also angled to point at the same location on the solar panel upper outer surface 14. The radiation sensor 120 is shaded by the solar panel cover frame from the direct rays of the sun to improve sensitivity to radiation sources reflected light. When there is no snow or ice precipitation on the panel cover glass, there is very little difference in the radiation sensor signal when the radiation sources are switched on and off. With measurable precipitation, a useful signal difference occurs. This part of the system can be located in the panel as described above or external to the panel in a separate embodiment, fabricated with the same translucent cover and specifically made for the servicing of many panels and with a view to cost effectiveness. This reflection method is insensitive to rain, fog and thin ice, conditions which do not degrade panel performance enough to warrant investing energy to clear the panel. U.S. Pat. No. 6,376,824 Optical Sensor describes a precipitation sensor using a photo diode in the path of the light from a LED after it is reflected by the glass upper surface. This device is sensitive to rain, fog and thin ice. This is necessary for a vehicle application, but would cause unnecessary precipitation removal attempts in an AWSP design. Other radiation sources which could be used are flashlight style light bulbs, infrared or ultraviolet emitters, and any light source piped through light fibers or the sensor mount to the glass. Other electromagnetic radiation sensors which could be used include cadmium based cells such as cadmium sulphide and cadmium telluride. The sensor 24 can be easily adapted to other solar panel assemblies, namely where the cover glass and photovoltaic array are an integrated dual pane assembly comprising a top pane of conductive glass and a bottom pane of photovoltaic glass, or an integrated assembly where the conductive and photovoltaic glasses are integrated into a laminate. The sensor 24 is located under a translucent assembly to illuminate a small area on the cover surface, or under a surrogate cover glass in the cover frame or a local extension of the cover glass for an opaque assembly.

Other sensors that may be implemented as alternative options for this winter precipitation sensing technology are illustrated below. These alternative sensors, although viable, are not presently as effective as the developed LED sensor design noted herein:

1. A sensor using positive and negative temperature coefficient resisters to heat and measure the temperature response of one or more sample areas on the cover glass or cover glass frame. This system is used in driveway de-icing systems
2. A vibration probe in the expected ice accumulation area. This method was designed for aircraft icing detectors.
3. Electrical conductivity measurement probes. This method senses when solid or liquid moisture increases the conductivity between spaced conductors.
4. Using an exterior illumination sensor and deducing that snow or ice is present when the solar panel's output is less than expected. This requires that the sensor be constantly heated to prevent precipitation from blinding it, or mounting the sensor under the panel and pointing at the north sky. And if the solar panel electricity generation malfunctions, energy would be wasted trying to clear nonexistent snow and ice.

These noted sensors can be implemented in one or more panels or in a separate smart sensor box to service many panels (including a solar park) at the same time.

VIII. Multiple Panel Configuration

Figure 24:
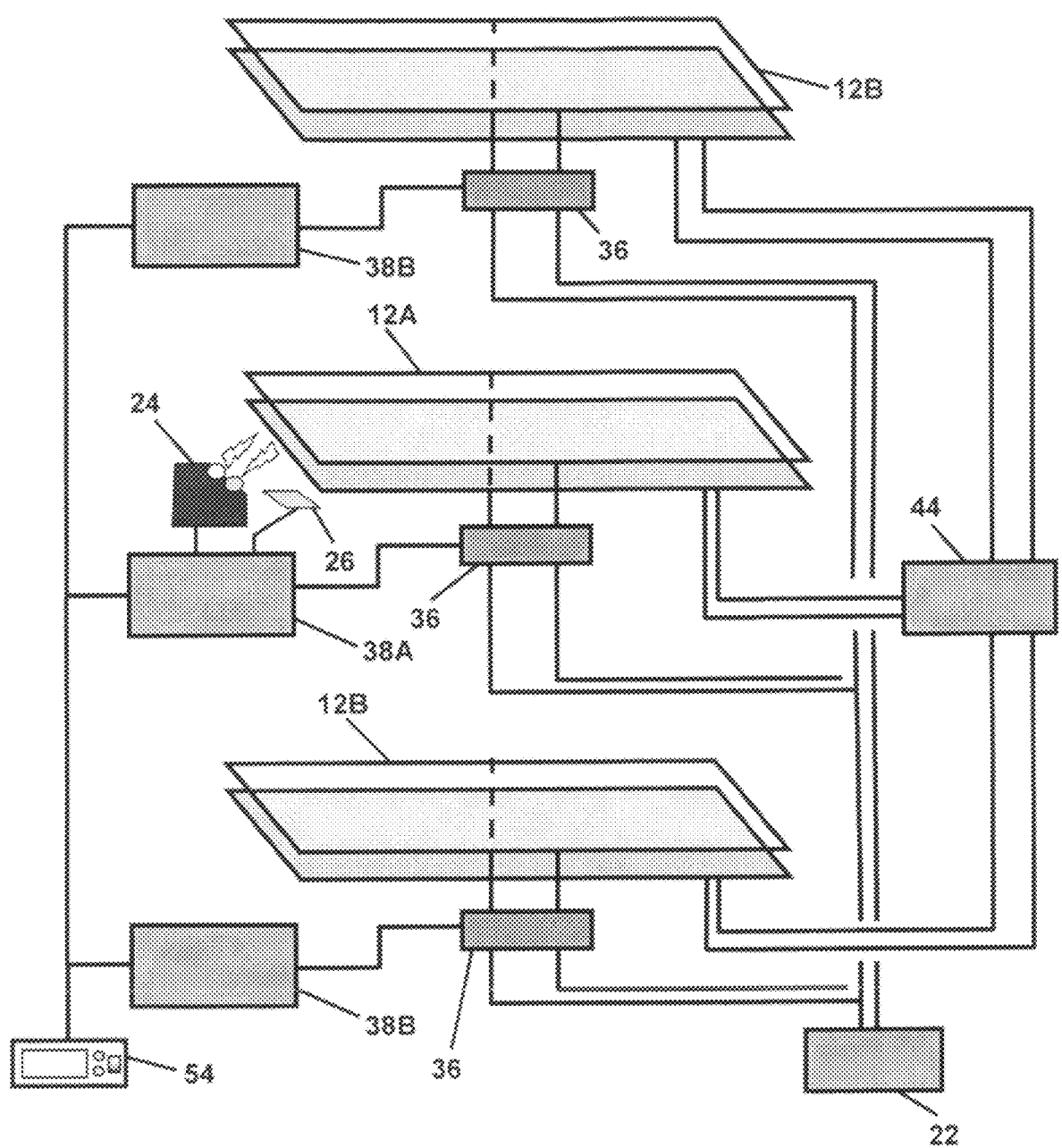
FIG. 24 is a diagrammatic representation of a winter solar panel assembly showing multiple framed panels.
Figure 25:
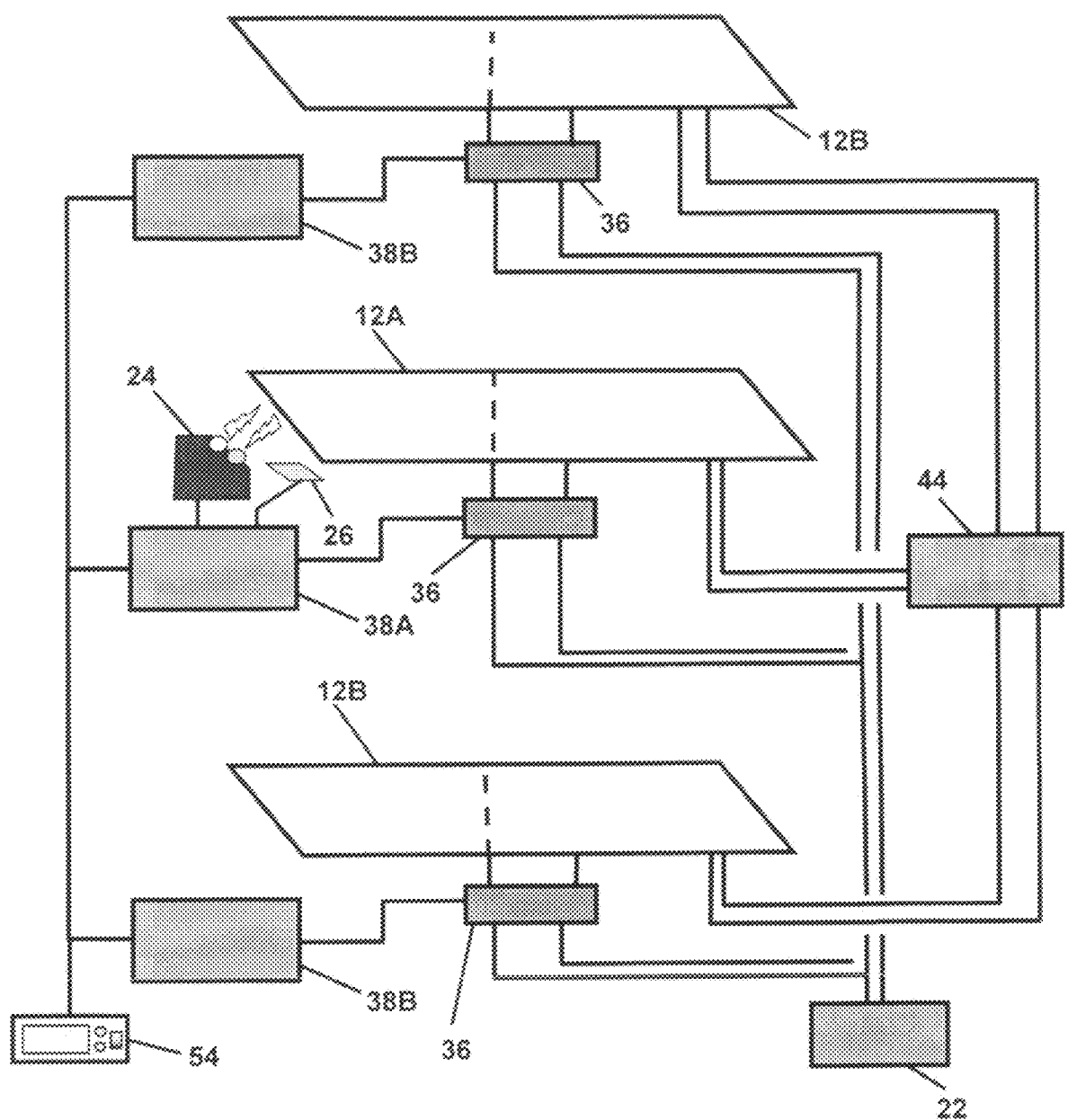
FIG. 25 is a diagrammatic representation of a winter solar panel assembly showing multiple frameless panels.

Referring now to FIGS. 24 and 25, a plurality of AWSPs 10 are shown with a plurality of solar panel installations. FIG. 24 illustrates multiple framed panels, whereas FIG. 25 illustrates multiple frameless panels. These examples are typical of a solar park and include the user heater supply 22 option and a common load 44 to achieve cost reductions. The sensors 24, 26 are connected to only one solar panel. A single user heater supply is connected to all heater supply switches 36. A master controller 38A in the panel containing the sensors 24, 26 sends heating and vibration commands to slave controllers 38B. Heating and vibration commands can be sequenced among the slave controllers to minimize the power load and therefore cost of user heater supply. The display 54 provides for user entry defining the number of the slave controllers 38B, identification of the master controller 38A, and the snow removal sequence among slave controllers 38B.

In the example illustrated, a three panel installation includes one master panel 12A and two slave panels 12B. A person skilled in the art will recognize that any number of slave panels can be connected to the master panel, subject to practical installation limits in heater supply wire lengths and the like.

Generally speaking, multiple panel installations will require some spatial separation between adjacent panels, in case the shaking is not synchronized because either the solenoids have response variations, or adjacent panels may be connected to different controllers Furthermore, the multiple panel installation can be extended to the use of a surrogate, in which the cover, vibrators, heater, master controller 38A and sensors are located in a non-photovoltaic assembly which representatively performs snow and/or sleet and/or ice and/or or hail removal, and the master controller 38A commands slave controllers 38B on the photovoltaic panels.

Operation

Referring now to FIG. 1, an operation of the system will be described in detail. It should be noted that a full heating and shaking cycle might not be necessary to remove the winter precipitation. The length of the cycle will depend on external temperatures and amount of accumulated winter precipitation. Restoring a solar panel to produce useful output when snow and/or sleet and/or ice precipitation is present requires a careful coordination of available power and events to achieve success. The first step is to make power available. For the self sufficient option, solar panel power is used to charge one or more of the batteries 27. As the batteries 27 become charged (which typically takes four to six hours), the excess power is then fed into the user's load. Only a small amount of power is then required to maintain the battery charge. For the user heater supply option, the solar panel output is always provided to the user load, and the user makes power available for the panel heater, either by buying back power previously supplied by the panel to an electric utility, or from the user's local source. For the heater supplement option, the user provided power is used only when the battery pack has insufficient charge. The controller 38 is initially programmed with an approximate start up date and installation latitude. After installation, the controller 38 periodically uses the snow and ice sensor output as an illumination sensor to synchronize with sunrise/sunset cycles. This synchronization is needed by the controller to avoid unproductive snow, sleet and ice removals at night when the panel cannot produce usable power. The date and latitude (with appropriate tolerances for an early winter and late spring) is also used by the controller to switch to summer mode, whereby nonessential equipment is switched off, and the controller processor lowers its clock frequency to conserve power. The controller 38 periodically monitors the temperature sensor 26 to determine when to look for snow and ice precipitation. A temperature above approximately 1 or 2° C. will suppress precipitation monitoring.

When winter temperatures exist, the controller 38 periodically activates the snow, sleet and ice sensor 24. The radiation sources 118 (LEDs) are switched on and the output of the radiation sensor 120 (photo transistor) is read. Then the LEDs are switched off and the radiation sensor 120 is read again. If there is no snow, sleet or ice, the difference between the two readings is small and caused by minor dirt on the glass and the fact that the glass is not perfectly translucent. Snow and sleet produces a large difference, while ice produces a smaller but still very usable difference.

The sensor 24 is more sensitive at low ambient illumination conditions when the LED light is stronger than the ambient light. The LED light has insufficient strength for a clear panel cover in daylight sun between approximately 9 AM and 3 PM. Any snow or ice that requires removing will block the ambient light, and will likely be accompanied by clouds that will further reduce the illumination. LED strength will then be sufficient. If the LED light has insufficient strength, snow and ice removal will not be scheduled by the controller, but the illumination on the photovoltaic array will be sufficient to produce a useful output.

The controller's programmed strategy is to sense snow, sleet and ice throughout the day and night and if present, schedule removal in the morning. For the user heater supply and heater supplement options, more frequent removals can be scheduled if more electrical power is available.

The minimum energy strategy for snow, sleet and ice removal uses gravity and the solar panel's tilt angle. Climates with a long winter are typically at higher latitudes where the panel tilt angle is higher, facilitating precipitation removal. The controller's programmed strategy is to turn on the heater and monitor the temperature sensor. When the glass temperature rises to the snow, sleet or ice melting temperature, and then rises more slowly, the bottom layer of snow, sleet or ice is melting. The adhesion of the snow, sleet or ice to the cover glass is substantially reduced by the thin layer of melt next to the cover glass. At this point, the vibrators are activated to avalanche the snow or ice off the cover glass. If the illumination sensed by the snow, sleet and ice sensor does not then indicate a rise, shorter heating and vibration cycles are activated until either the illumination rises or a programmed energy consumption budget is reached. The removal cycle will be halted if the illumination rises during the heating cycle before the vibrators are activated, indicating that the snow, sleet or ice has avalanched off due to its own weight.

This strategy works best with a thick snow blanket. Thick snow is a better insulator which minimizes heat loss to the ambient air while the cover glass is being heated. This strategy does not work as well with thin sleet or ice, but thin sleet or ice allows a useful solar panel output and is easily removed by the sun.

The energy required is near zero at 0° C., and increases linearly as the ambient temperature drops below 0° C. At −10° C., a standard 1.6 square meter panel requires approximately 900 watts for 5 minutes for each removal cycle. At −20° C., this increases to 900 watts for 10 minutes for each removal cycle. Five −20° C. removal cycles are budgeted to allow for multiple precipitation days before the sun is available to power the solar panel and recharge the battery. This requires a 100 amp-hour battery pack.

On a sunny day, the standard panel will produce approximately 6 amperes at 30 VDC. The battery charger will use approximately half that output for approximately 5 hours to restore the battery to useful capacity. After that, the charge current is reduced by the charger until the battery is fully charged.

The system will function down to −40° C., but to make most of the panel's output energy available to the user, the controller strategy below −20° C. is to use the vibrators only should the option be implemented in the panel. The energy consumption demand for the vibrator system is small, and at that temperature, the precipitation is usually powder snow, which avalanches easily. As the temperature drops, battery charging and output efficiency decreases.

An option available is a remote display 54 connected to the controller 38. When the display 34 is turned on, the controller 38 sends useful status information such as panel voltage and current, battery voltage, panel temperature, recent ice and snow removal events, and any faults detected. The user can also enter mode commands based on predicted weather to optimize the snow and ice removal strategy, to include mode commands for master/slave multiple panel installations. The display 54 and controller 38 are on a bus cable, allowing the display to transfer information with multiple controllers.

It is to be understood that the device and system described herein are readily adaptable to other photovoltaic configurations such as an integrated dual pane assembly comprising a top pane of conductive glass and a bottom pane of photovoltaic glass, and an integrated assembly where the conductive and photovoltaic glasses are integrated into a laminate, and where photovoltaic capability is integrated into conventional and non-conventional building materials (in a horizontal or vertical manner) such as siding, atrium panels, greenhouse roofs, walls, decks, roof shingles or where solar cells are embedded in conventional or non-conventional materials and all for the purpose of obtaining solar power.

The device and system described herein need a minimal amount of the solar panel's output energy to autonomously remove snow, frost, sleet, and/or ice precipitation. Once the solar panel upper cover is at the melting temperature, the snow, frost, sleet and/or ice adhesion substantially reduces, and the winter precipitation slides off or may be avalanched off using the vibrators option. Conventional techniques require additional energy to melt winter precipitation. At an ambient temperature of −20° C., the energy required for the said system is 360 kilojoules for a one centimeter snow water equivalent (SWE) snow or ice per panel square meter, compared to 3660 kilojoules for conventional techniques. The energy required for the system reduces linearly to zero at 0° C., compared to reducing to 3300 kilojoules for said conventional techniques. Conventional high efficiency solar panels generate about 125 watts per square meter at standard temperature, increasing to about 150 watts per square meter at −20° C. For a typical five day winter cycle of three days of sun and two days of winter precipitation, the solar panel will generate about 9000 kilojoules if the winter precipitation is removed.

In an example, a design budget whereby it snows for five days in a row comprises five removal attempts (one per day) during the five day cycle at −20° C., where battery charging efficiency is 40 percent. The energy drawn from the panel is (360×5)/0.40=4500 kilojoules, or half the panel's capacity. As the ambient temperature approaches 0° C., the available panel capacity approaches 100 percent as the energy drawn for removal approaches zero.

The technology supports a green environment, reducing dependence on fossil fuels by making solar panel use effective in winter climates. The usage includes but is not limited to commercial solar parks and residential applications seeking to effectively increase and/or maximize solar panel energy output or establish electricity generation in winter for locations that would never have been contemplated for solar panel use prior.

Although the above description relates to a specific preferred embodiment as presently contemplated by the inventor, it will be understood that the AWSP in its broad aspect includes mechanical and functional equivalents of the elements described herein.

We claim:

1. An autonomous solar panel system for use in winter conditions, the system comprising:
   a master solar panel having a master energy transfer member associated therewith, the master energy transfer member comprising a combination of a master electrical vibration assembly and at least one of a master frame heater and a master electrical heater, the master electrical heater composed of a first serpentine wire disposed in proximity to a surface of the master solar panel, said master electrical vibration assembly comprising a master vibration actuator, a master vibration plunger and a master resilient vibration lever connected to the master solar panel, the master solar panel having an upper surface and at least one photovoltaic array for converting solar radiation to electrical energy;
   a plurality of slave solar panels, each slave solar panel having a slave energy transfer member associated therewith, the slave energy transfer member comprising a combination of a slave electrical vibration assembly and at least one of a slave frame heater and a slave electrical heater, the slave electrical heater composed of a second serpentine wire disposed in proximity to the surface of the respective slave solar panel, the slave electrical vibration assembly comprising a slave vibration actuator, a slave vibration plunger and a slave resilient vibration lever connected to the respective slave solar panel, each slave solar panel having an upper surface and at least one photovoltaic array for converting solar radiation to electrical energy;
a winter precipitation sensor in communication with the master solar panel, the winter precipitation sensor having a top and a side and
  i one or more radiation emitters for emitting radiation along a first axis towards an amount of winter precipitation on the master solar panel surface and
  ii a radiation detector located adjacent the one or more radiation emitters, the radiation detector being located to receive reflected radiation from the winter precipitation along a second axis, the first axis being angled towards the second axis when viewed from the sensor top, both the first and second axes being at a same incidence angle to the master solar panel surface when viewed from the sensor side, the master solar panel surface reflecting emitter radiation angled away from the second axis on a basis of said incidence angle when viewed from the sensor side, the radiation detector producing a current flow signal proportional to the received irradiance, the one or more radiation emitters being located on either side of the radiation detector when viewed from the sensor top;
  wherein the one or more radiation emitters includes two radiation emitters located on opposite sides of the radiation detector, the two radiation emitters being mounted to emit radiation along their respective first axe towards a common point on the master solar panel surface;
a master controller connected to the master solar panel;
a plurality of slave controllers, each slave controller being connected to a respective one of the plurality of slave solar panels;
an electrical power supply and charger connected to each of the master and slave energy transfer members; and
a network, to include the master and slave controllers, electrical heater switches, frame switches and electrical vibrator switches, interconnecting the energy transfer members, the sensor, and the electrical power supply, the network being configured such that in response to the winter precipitation sensor sensing an accumulation of winter precipitation on the master solar panel, the master controller directs a portion of stored power in the electrical power supply to activate first at least one of the master electrical heater and the master frame heater, followed by the master vibration activator, so as to autonomously remove the winter precipitation from the upper surface of the master solar panel and then the master controller directs the slave controllers sequentially to direct a portion of stored power in the electrical power supply to activate first at least one of the respective slave electrical heater and slave frame heater, followed by the respective slave vibration activator, so as to remove the winter precipitation from the upper surface of the respective slave solar panel.

2. The system, according to claim 1, in which each solar panel includes a solar panel cover, the electrical heater of the respective energy transfer member is embedded within the solar panel cover.

3. The system, according to claim 2, in which the serpentine wire of the electrical heater is disposed substantially across the entire solar panel cover.

4. The system, according to claim 1, in which the electrical power supply is a battery.

5. The system, according to claim 1, in which a load switch connects to the charger.

6. The system, according to claim 5, in which a user load connects to the load switch.

7. The system, according to claim 1, in which the master solar panel further includes a temperature sensor.

8. The system, according to claim 7, in which the temperature sensor of the master solar panel is sandwiched between the respective solar panel cover and photovoltaic array, the master controller connects to the temperature sensor.

9. The system, according to claim 5, in which the network includes a user heater voltage supply that connects to the load switch.

10. The system, according to claim 1, in which the network includes a user load connecting a controller to the solar panel photovoltaic array of the system.

11. The system, according to claim 1, in which the network includes a supplemental heater switch connecting the controller to a heater supplement supply.

12. The system, according to claim 1, in which the network includes a remote display connected to the master controller.

13. The system, according to claim 2, in which the electrical vibration assembly of each solar panel is sandwiched between the respective solar panel cover and photovoltaic array.

14. The system, according to claim 1, in which the electrical vibration assembly of each solar panel is located at the periphery of the respective solar panel.

15. The system, according to claim 1, in which each of the master and slave solar panels includes four vibration assemblies, two of which are spaced apart and located at a top edge of the respective solar panel, the other two being spaced apart and located at a bottom edge of the respective solar panel.

16. The system, according to claim 13, in which the electrical vibration assembly of each solar panel is a vertical vibration assembly including a vertical vibration actuator and a vertical vibration plunger.

17. The system, according to claim 2, in which a frame holds together the respective solar panel cover and the photovoltaic array of each solar panel.

18. The system, according to claim 17, in which each frame heater includes a plurality of electrical heater elements connected to a frame heater switch, the electrical heater elements extending substantially along the bottom of the respective frame.

19. The system, according to claim 4, in which the electrical power supply includes a plurality of batteries located between the underside of each solar panel and a respective panel tilt mount on which the solar panel and batteries are mounted.

20. The system, according to claim 4, in which the electrical power supply includes a plurality of batteries located in or on the side of a vertical post connected to a panel tilt mount on which each solar panel is mounted.

21. The system, according to claim 4, in which the electrical power supply includes a plurality of batteries located between the underside of each solar panel and a respective frame mount on which the solar panel is mounted.

22. The system, according to claim 4, in which the electrical power supply includes a plurality of batteries located separately from the master and slave solar panels.

23. The system, according to claim 4, in which the electrical power supply includes a plurality of batteries located between the underside of each solar panel and a respective roof mount on which the solar panel is mounted.

24. The system, according to claim 1 in which the sensor includes one or more light emitting devices which illuminate the master solar panel upper surface and a light sensing device which senses the reflection caused by winter precipitation.

25. The system, according to claim 7, in which the temperature sensor is located on an inner surface of a solar panel cover of the master solar panel to determine when winter precipitation is possible and to determine when the solar panel cover has been adequately heated.

26. An autonomous solar panel system for use in winter conditions, the system comprising:
a master solar panel;
a master heater element associated with the master solar panel, the master heater element comprised of a master frame heater and a master electrical heater, the master electrical heater composed of a first serpentine wire disposed in proximity to a surface of the master solar panel;
a winter precipitation sensor in communication with the master heater element, the winter precipitation sensor having a top and a side and
  i one or more radiation emitters for emitting radiation along a first axis towards an amount of winter precipitation on the master solar panel surface; and
  ii a radiation detector located adjacent the one or more radiation emitters, the radiation detector being located to receive reflected radiation from the winter precipitation along a second axis, the first axis being angled towards the second axis when viewed from the sensor top, both the first and second axes being at a same incidence angle to the master solar panel surface when viewed from the sensor side, the master solar panel surface reflecting emitter radiation angled away from the second axis on a basis of said incidence angle when viewed from the sensor side, the radiation detector producing a current flow signal proportional to the received irradiance, the one or more radiation emitters being located on either side of the radiation detector when viewed from the sensor top;
wherein the one or more radiation emitters includes two radiation emitters located on opposite sides of the radiation detector, the two radiation emitters being mounted to emit radiation along their respective first axes towards a common point on the master solar panel surface;
an electrical power supply connected to the master heater element;
a plurality of slave solar panels, each slave solar panel having a slave heater element associated therewith, the slave heater element comprised of a slave frame heater and a slave electrical heater, the slave electrical heater composed of a second serpentine wire disposed in proximity to a surface of the slave solar panel;
a network, to include the master and slave solar panels, interconnecting the master and slave heater elements, the sensor, and the electrical power supply, the network being configured such that in response to the sensor sensing an accumulation of winter precipitation on the master solar panel, a portion of stored power in the electrical power supply activates the master and slave heater elements so as to heat the master and slave solar panels to remove the winter precipitation therefrom.

27. An autonomous solar panel system for use in winter conditions, the system comprising:
a master solar panel;
a master electrical vibration assembly associated with the master solar panel, said master electrical vibration assembly comprising a master vibration actuator, a master vibration plunger and a master resilient vibration lever connected to the master solar panel;
a winter precipitation sensor in communication with the master electrical vibration assembly, the winter precipitation sensor having a top and a side, and
  i one or more radiation emitters for emitting radiation along a first axis towards an amount of winter precipitation on the master solar panel surface; and
  ii a radiation detector located adjacent the one or more radiation emitters, the radiation detector being located to receive reflected radiation from the winter precipitation along a second axis, the first axis being angled towards the second axis when viewed from the sensor top, both the first and second axes being at a same incidence angle to the master solar panel surface when viewed from the sensor side, the master solar panel surface reflecting emitter radiation angled away from the second axis on a basis of said incidence angle when viewed from the sensor side, the radiation detector producing a current flow signal proportional to the received irradiance, the one or more radiation emitters being located on either side of the radiation detector when viewed from the sensor top;
wherein the one or more radiation emitters includes two radiation emitters located on opposite sides of the radiation detector, the two radiation emitters being mounted to emit radiation along their respective first axes towards a common point on the master solar panel surface;
an electrical power supply connected to the master electrical vibration assembly;
a plurality of slave solar panels, each slave solar panel having a slave electrical vibration assembly associated therewith, said slave electrical vibration assembly comprising a slave vibration actuator, a slave vibration plunger and a slave resilient vibration lever connected to the slave solar panel;
a network, to include the master and slave solar panels, interconnecting the master and slave electrical vibration assemblies, the sensor, and the electrical power supply, the network being configured such that in response to the sensor sensing an accumulation of winter precipitation on the master solar panel, a portion of stored power in the electrical power supply activates the master and slave electrical vibration assemblies so as to vibrate the master and slave solar panels to remove the winter precipitation therefrom.

28. An autonomous solar panel system for use in winter conditions, the system comprising:
- a master solar panel;
- a combination of a master heater element and master electrical vibration assembly associated with the master solar panel, the master heater element comprised of a master frame heater and a master electrical heater, the master electrical heater composed of a first serpentine wire disposed in proximity to a surface of the master solar panel, said master electrical vibration assembly comprising a master vibration actuator, a master vibration plunger and a master resilient vibration lever connected to the master solar panel;
- a winter precipitation sensor in communication with the master heater element and master vibration assembly, the winter precipitation sensor having a top and a side and
  - i one or more radiation emitters for emitting radiation along a first axis towards an amount of winter precipitation on the master solar panel surface; and
  - ii a radiation detector located adjacent the one or more radiation emitters, the radiation detector being located to receive reflected radiation from the winter precipitation along a second axis, the first axis being angled towards the second axis when viewed from the sensor top, both the first and second axes being at a same incidence angle to the master solar panel surface when viewed from the sensor side, the solar panel surface reflecting emitter radiation angled away from the second axis on a basis of said incidence angle when viewed from the sensor side, the radiation detector producing a current flow signal proportional to the received irradiance, the one or more radiation emitters being located on either side of the radiation detector when viewed from the sensor top;
- wherein the one or more radiation emitters includes two radiation emitters located on opposite sides of the radiation detector, the two radiation emitters being mounted to emit radiation along their respective first axes towards a common point on the master solar panel surface;
- an electrical power supply connected to the master heater element and master vibration assembly;
- a plurality of slave solar panels, each slave solar panel having a combination of a slave heater element and a slave electrical vibration assembly associated therewith, the slave heater element comprised of a slave frame heater and a slave electrical heater, the slave electrical heater composed of a second serpentine wire disposed in proximity to a surface of the slave solar panel, said slave electrical vibration assembly comprising a slave vibration actuator, a slave vibration plunger and a slave resilient vibration lever connected to the slave solar panel;
- a network, to include the master and slave solar panels, interconnecting the slave heater element, the slave electrical vibration assembly, the sensor, and the electrical power supply, the network being configured such that in response to the sensor sensing an accumulation of winter precipitation on the master solar panel, a portion of stored power in the electrical power supply activates the master and slave heater elements and master and slave electrical vibration assemblies so as to heat and vibrate the master and slave solar panels to remove the winter precipitation therefrom.

29. An autonomous solar panel cleaning system for use in winter conditions, the system comprising:
- a master solar panel including a master controller;
- at least one master energy transfer member associated with the master solar panel, the master energy transfer member comprising a combination of a master electrical vibration assembly and at least one of a master frame heater and a master electrical heater, the master electrical heater composed of a first serpentine wire disposed in proximity to a surface of the master solar panel, said master electrical vibration assembly comprising a master vibration actuator, a master vibration plunger and a master resilient vibration lever connected to the master solar panel;
- a winter precipitation sensor in communication with the master energy transfer member, the winter precipitation sensor having a top and a side and
  - i one or more radiation emitters for emitting radiation along a first axis towards an amount of winter precipitation on a surface of the master solar panel; and
  - ii a radiation detector located adjacent the one or more radiation emitters, the radiation detector being located to receive reflected radiation from the winter precipitation along a second axis, the first axis being angled towards the second axis when viewed from the sensor top, both the first and second axes being at a same incidence angle to the master solar panel surface when viewed from the sensor side, the master solar panel surface reflecting emitter radiation angled away from the second axis on a basis of said incidence angle when viewed from the sensor side, the radiation detector producing a current flow signal proportional to the received irradiance, the one or more radiation emitters being located on either side of the radiation detector when viewed from the sensor top;
- wherein the one or more radiation emitters includes two radiation emitters located on opposite sides of the radiation detector, the two radiation emitters being mounted to emit radiation along their respective first axes towards a common point on the master solar panel surface;
- an electrical power supply connected to the master energy transfer member;
- a plurality of slave solar panels, each slave solar panel having a slave controller;
- at least one slave energy transfer member associated with each slave solar panel, the slave energy transfer member comprising a combination of a slave electrical vibration assembly and at least one of a slave frame heater and a slave electrical heater, the slave electrical heater composed of a first serpentine wire disposed in proximity to a surface of the slave solar panel, said slave electrical vibration assembly comprising a slave vibration actuator, a slave vibration plunger and a slave resilient vibration lever connected to the slave solar panel;
- a network, to include master and slave solar panels, interconnecting the master and slave controllers, the master and slave energy transfer members, the sensor, the electrical power supply, the network being configured such that in response to the sensor sensing an accumulation of winter precipitation on the master solar panel, a portion of stored power in the electrical power supply activates the energy transfer member so as to remove the winter precipitation from the master and slave solar panels.

30. A circuit comprising:
a master solar panel having a master energy transfer member associated therewith, the master energy transfer member comprising a combination of a master electrical vibration assembly and at least one of a master frame heater and a master electrical heater, the master electrical heater composed of a first serpentine wire disposed in proximity to a surface of the master solar panel, said master electrical vibration assembly comprising a master vibration actuator, a master vibration plunger and a master resilient vibration lever connected to the master solar panel, the master solar panel having an upper surface and at least one photovoltaic array for converting solar radiation to electrical energy;
a plurality of slave solar panels, each slave solar panel having a slave energy transfer member associated therewith, the slave energy transfer member comprising a combination of a slave electrical vibration assembly and at least one of a slave frame heater and a slave electrical heater, the slave electrical heater composed of a second serpentine wire disposed in proximity to the surface of the respective slave solar panel, the slave electrical vibration assembly comprising a slave vibration actuator, a slave vibration plunger and a slave resilient vibration lever connected to the respective slave solar panel, each slave solar panel having an upper surface and at least one photovoltaic array for converting solar radiation to electrical energy;
a winter precipitation sensor in communication with the master energy transfer member, the winter precipitation sensor having a top and a side and
  i one or more radiation emitters for emitting radiation along a first axis towards an amount of winter precipitation on a surface of the master solar panel; and
  ii a radiation detector located adjacent the one or more radiation emitters, the radiation detector being located to receive reflected radiation from the winter precipitation along a second axis, the first axis being angled towards the second axis when viewed from the sensor top, both the first and second axes being at a same incidence angle to the master solar panel surface when viewed from the sensor side, the master solar panel surface reflecting emitter radiation angled away from the second axis on a basis of said incidence angle when viewed from the sensor side, the radiation detector producing a current flow signal proportional to the received irradiance, the one or more radiation emitters being located on either side of the radiation detector when viewed from the sensor top;
  wherein the one or more radiation emitters includes two radiation emitters located on opposite sides of the radiation detector, the two radiation emitters being mounted to emit radiation along their respective first axes towards a common point on the master solar panel surface;
an electrical power supply connected to the master and slave energy transfer members;
a network interconnecting the master and slave energy transfer members, the sensor, and the electrical power supply, the network being configured such that in response to the sensor sensing an accumulation of winter precipitation on the master solar panel, a portion of stored power in the electrical power supply activates the master and slave energy transfer members so as to remove winter precipitation from the master and slave solar panels.

31. The system, according to claim 17, in which the upper surface of each solar panel and the frame are covered with a non-stick translucent material to permit panel cleaning and slippage of winter precipitation.

32. The system, according to claim 1, in which the master and slave solar panels are mounted horizontally.

33. The system, according to claim 1, wherein the master and slave solar panels each include an integrated dual pane assembly having a top pane of glass containing the energy transfer member, and a bottom pane of photovoltaic glass.

34. The system, according to claim 1, in which the energy transfer members are frame heater extensions which are connected to the lower edge of the master and slave solar panels and to a master and slave frame heater switches via junctions, the junctions being electrically connected in series so as to prevent the formation of icicles or snow dams at the lower edge of the master and slave solar panels during freeze-thaw weather conditions and to combat potential ice build up.

35. The system, according to claim 26, in which the heater element includes heater element extensions that are frame heater extensions which are connected to the lower edge of the master and slave solar panels and to master and slave frame heater switches via junctions, the junctions being electrically connected in series, so as to prevent the formation of icicles or snow dams at the lower edge of the master and slave solar panels during freeze-thaw weather conditions and to combat potential ice build up.

36. The system, according to claim 27, further comprising a heater element comprising frame heater extensions which are connected to the lower edge of the master and slave solar panels and to a master and slave frame heater switches via junctions, the junctions being electrically connected in series, so as to prevent the formation of icicles or snow dams at the lower edge of the master and slave solar panels during freeze-thaw weather conditions and to combat potential ice build up.

37. The system, according to claim 28, in which the heater element comprises heater element extensions that are frame heater extensions which are connected to the lower edge of the master and slave solar panels and to master and slave frame heater switches via junctions, the junctions being electrically connected in series, so as to prevent the formation of icicles or snow dams at the lower edge of the master and slave solar panels during freeze-thaw weather conditions and to combat potential ice build up.

38. The system, according to claim 29, in which the energy transfer member comprises energy transfer member extensions that are frame heater extensions which are connected to the lower edge of the master and slave solar panels and to a master and slave frame heater switches via junctions, the junctions being electrically connected in series, so as to prevent the formation of icicles or snow dams at the lower edge of the master and slave solar panels during freeze-thaw weather conditions and to combat potential ice build up.

39. The system, according to claim 1, in which the energy transfer member comprises energy transfer member extensions that are frame heater extensions which are connected to the lower edge of the master and slave solar panels and to a master and slave frame heater switches via junctions, the junctions being electrically connected in series, so as to prevent the formation of icicles or snow dams at the lower edge of the master and slave solar panels during freeze-thaw weather conditions and to combat potential ice build up.

40. The circuit, according to claim 30, in which the energy transfer member comprises energy transfer member extensions that are frame heater extensions which are connected to the lower edge of the master and slave solar panels and to a master and slave frame heater switches via junctions, the junctions being electrically connected in series, so as to prevent the formation of icicles or snow dams at the lower edge of the master and slave solar panels during freeze-thaw weather conditions and to combat potential ice build up.

41. The system, according to claim 33, in which the top pane of the integrated dual pane assembly is integrated as a laminate with the photovoltaic glass, and the energy transfer member is in contact with and below the laminate.

\* \* \* \* \*